(12) United States Patent
Gebara et al.

(10) Patent No.: US 11,875,408 B2
(45) Date of Patent: Jan. 16, 2024

(54) TECHNIQUES FOR ACCURATE EVALUATION OF A FINANCIAL PORTFOLIO

(71) Applicant: State Street Corporation, Boston, MA (US)

(72) Inventors: Fadi Gebara, Boston, MA (US); Ram Rajamony, Boston, MA (US); Ahmed Gheith, Boston, MA (US)

(73) Assignee: State Street Corporation, Boston, MA (US)

( * ) Notice: Subject to any disclaimer, the term of this patent is extended or adjusted under 35 U.S.C. 154(b) by 0 days.

(21) Appl. No.: 16/390,406

(22) Filed: Apr. 22, 2019

(65) Prior Publication Data

US 2019/0325524 A1   Oct. 24, 2019

Related U.S. Application Data

(60) Provisional application No. 62/663,558, filed on Apr. 27, 2018, provisional application No. 62/661,195, filed on Apr. 23, 2018.

(51) Int. Cl.
*G06Q 40/06* (2012.01)
*G06Q 40/04* (2012.01)
*G06Q 10/0637* (2023.01)

(52) U.S. Cl.
CPC ....... *G06Q 40/06* (2013.01); *G06Q 10/06375* (2013.01); *G06Q 40/04* (2013.01)

(58) Field of Classification Search
CPC .. G06Q 40/06; G06Q 10/06375; G06Q 40/04; G06Q 10/00; G06Q 10/04; G06Q 10/06; G06Q 10/063; G06Q 10/0637; G06Q 10/067; G06Q 30/02; G06Q 30/0201; G06Q 30/0206; G06Q 30/0215; G06Q 30/0216; G06Q 30/0278; G06Q 30/0283; G06Q 30/06; G06Q 30/0611; G06Q 40/00; G06Q 99/00

See application file for complete search history.

(56) References Cited

U.S. PATENT DOCUMENTS

| | | | |
|---|---|---|---|
| 7,337,135 B1 * | 2/2008 | Findlay, III | G06Q 40/00 705/35 |
| 7,587,354 B2 * | 9/2009 | Parsons | G06Q 40/00 705/35 |
| 8,577,701 B1 * | 11/2013 | Howard | G06Q 40/00 705/4 |
| 2003/0101121 A1 * | 5/2003 | Spampinato | G06Q 40/06 705/36 R |
| 2004/0243492 A1 * | 12/2004 | Korisch | G06Q 40/04 705/35 |

(Continued)

*Primary Examiner* — Namrata Boveja
*Assistant Examiner* — Divesh Patel
(74) *Attorney, Agent, or Firm* — Goodwin Procter LLP

(57) ABSTRACT

Various embodiments are generally directed to techniques for accurate evaluation of a financial portfolio. Techniques described herein may include an apparatus comprising: a processing circuit; and an approximate computing engine, executed on the processing circuit, operative to process data items corresponding to prices of funds, compute a Net Asset Value (NAV) based on the data items, determine a precision associated with the Net Asset Value (NAV), and based upon a precision metric, determine whether to use the Net Asset Value (NAV) in a business decision. Other embodiments are described.

13 Claims, 16 Drawing Sheets

(56) References Cited

U.S. PATENT DOCUMENTS

| | | | |
|---|---|---|---|
| 2008/0262976 A1* | 10/2008 | Gvelesiani | G06Q 40/06 705/36 R |
| 2015/0172995 A1* | 6/2015 | Delattre | H04L 45/70 370/218 |
| 2017/0232300 A1* | 8/2017 | Tran | H04L 67/10 434/247 |

* cited by examiner

Relational Database
*1100*

| did | cid | t | v |
|---|---|---|---|
| 120 | 100 | 1 | 10 |
| ∞ | 110 | 2 | 20 |
| ∞ | 120 | 1 | 8 |

Immutable Log
*800*

| Data: At time 1, value = 10 | Data: At time 2, value = 20 | Correction: At time 1, value was 8 |
|---|---|---|

*FIG. 12C*

Relational Database
1100

| did | cid | t | v |
|---|---|---|---|
| 120 | 100 | 1 | 10 |
| ∞ | 110 | 2 | 20 |
| 130 | 120 | 1 | 8 |
| ∞ | 130 | 1 | 5 |

Immutable Log
800

| Data: At time 1, value = 10 | Data: At time 2, value = 20 | Correction: At time 1, value was 8 | Correction: At time 1, value was 5 |

*FIG. 12D*

TECHNIQUES FOR ACCURATE EVALUATION OF A FINANCIAL PORTFOLIO

CROSS-REFERENCE TO RELATED APPLICATIONS

This application claims the benefit of U.S. Provisional Application No. 62/661,195, filed Apr. 23, 2018. This application also claims the benefit of U.S. Provisional Application No. 62/663,558, filed Apr. 27, 2018. The aforementioned provisional applications are incorporated by reference herein in their entirety.

BACKGROUND

Financial markets and exchanges typically operate on a computer-networked environment in which numerous different systems communicate with each other various types of information. Some communications consist of electronic financial transactions including the buying and selling of securities, such as stocks and bonds. It is appreciated that other electronic financial transactions can operate on a diversity of fund types. These electronic financial transactions change prices of funds in a financial portfolio and, in combination with other data, confer a value for a financial portfolio.

However, regarding the above computer-network environment, the value of the financial portfolio may not reflect recent market conditions. Various technical limitations in the computer-networked environment prevent the computation of the value of the financial portfolio for a current period of time.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for accurate evaluation of a financial portfolio. One exemplary evaluation is directed towards an aspect of that portfolio such as an evaluation of that portfolio's holdings. One characteristic of the issues facing banking or other financial institutions is that performance information corresponding to those holdings is not provided by current conventional systems in real-time or even close to real-time. Techniques described herein may provide computing technology for fast processing of financial performance information being stored across a computer-networked environment, including prices of those holdings as set by the financial markets in their current state. Therefore, the techniques described herein provide an advantage by predicting such performance information with an acceptable level of precision. Some embodiments describe techniques to facilitate business decision making by providing performance information that corresponds to those holdings and reflects current market conditions.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIGS. 12A-12D depict an example in which entries are added to the relational database and reflected on the immutable log.

DETAILED DESCRIPTION

Figure 1:
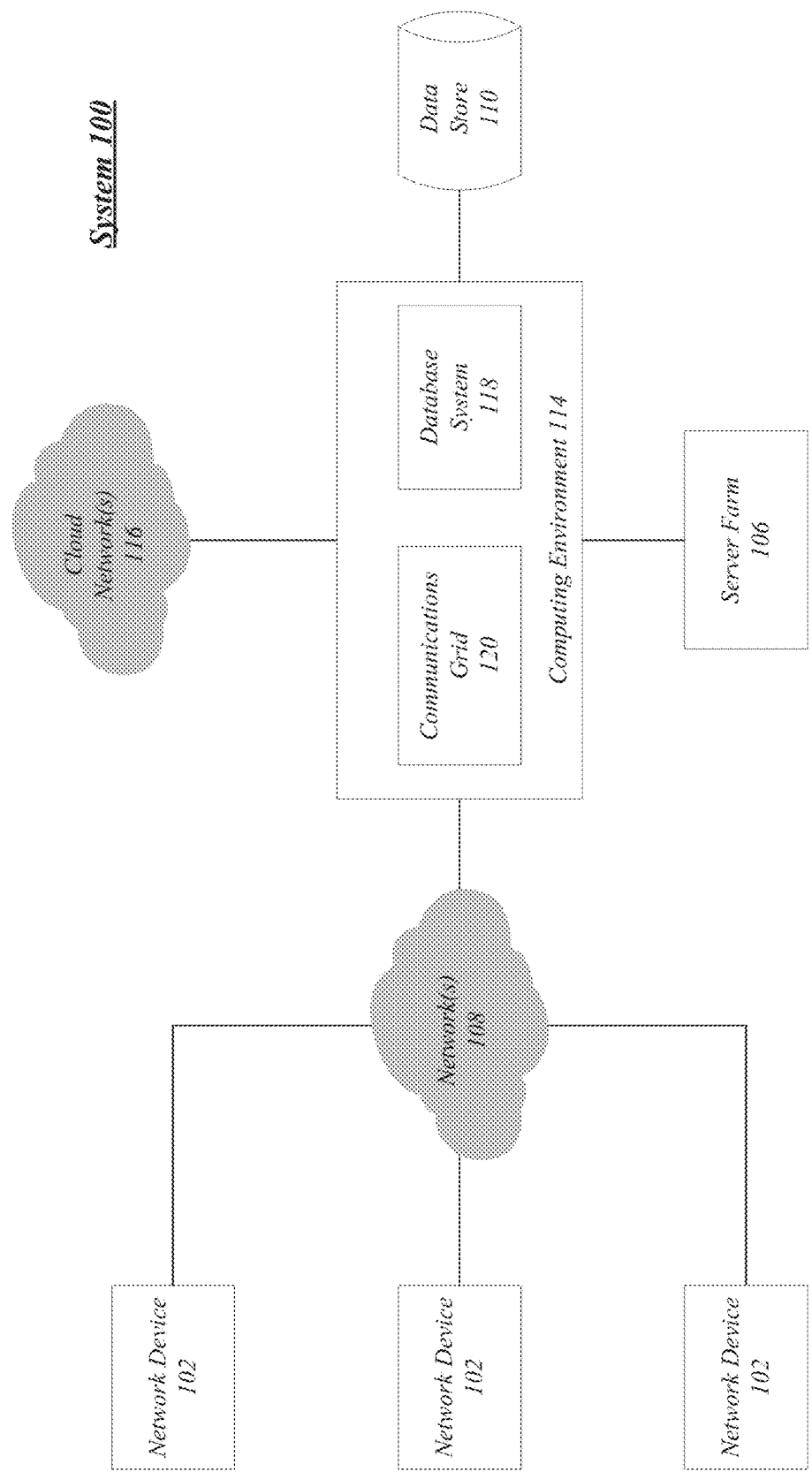
FIG. 1 is a block diagram that provides an illustration of hardware components of a data transmission network.

Various embodiments are generally directed to techniques for accurate evaluation of a financial portfolio. Techniques described herein may provide computing technology for fast processing of financial performance information being stored across a computer-networked environment. Some embodiments describe the computer-networked environment as having one or more computing devices communicably coupled to global financial markets and institutions. Rather than waiting for the end of trading, for example, these embodiments may process fund prices in real-time and predict certain portions of the financial performance information to within a level of accuracy. Some embodiments include an apparatus comprising: a processing circuit; and an approximate computing engine, executed on the processing circuit, operative to process data items corresponding to prices of funds, compute a Net Asset Value (NAV) based on the data items, determine a precision associated with the Net Asset Value (NAV), and based upon a precision metric, determine whether to use the Net Asset Value (NAV) in a business decision.

In some embodiments directed to wait until the end of trading, an immutable log may be employed—in addition or as an alternative to the approximate computing engine—in a technique for accurate evaluation of the financial portfolio. As described herein, conventionally transaction data is stored in a database which is updated as the data entries are subsequently changed or corrected. This, however, leads to problems when different users querying the database cannot agree on the state of the data because they each can receive different responses when asking the same question. In order to address these (and other) problems, a data storage system based on immutable logs implemented as a persistent relational database (or databases) is proposed and described below. The immutable logs have several characteristics making them particularly well-suited to storing transactional data (e.g., fund prices) as informational items.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that are capable of communicating with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

In other embodiments, network devices may provide a large amount of data, either all at once or streaming over a period of time to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things (IoT), such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw)

data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
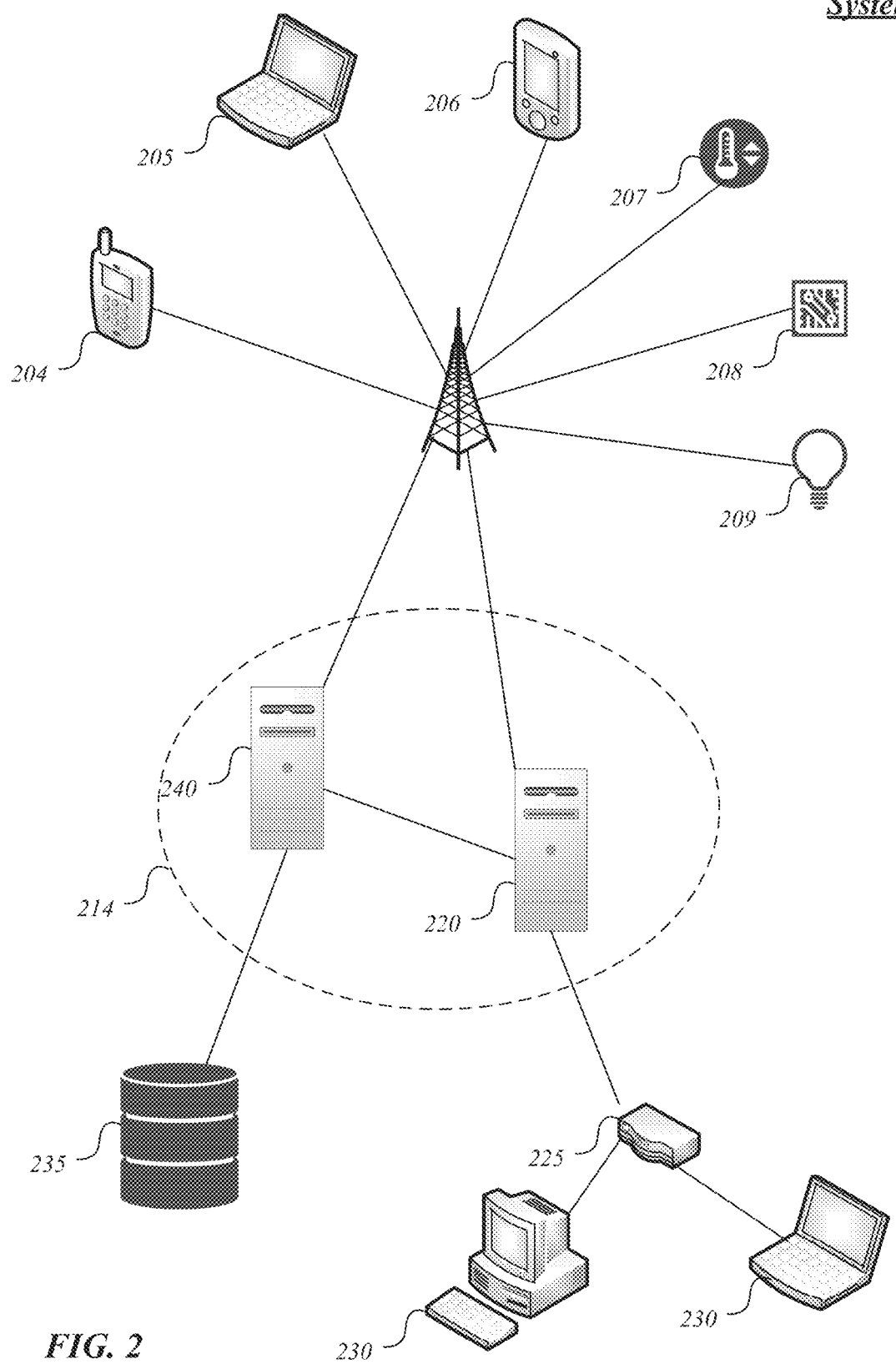
FIG. 2 illustrates an example network including a set of devices.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., a financial operation). The network devices may detect and record data related to the environment that it monitors, and transmit that data to computing environment 214.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 202 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 214, or before deciding whether to transmit data to the computing environment 214. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240, such as a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
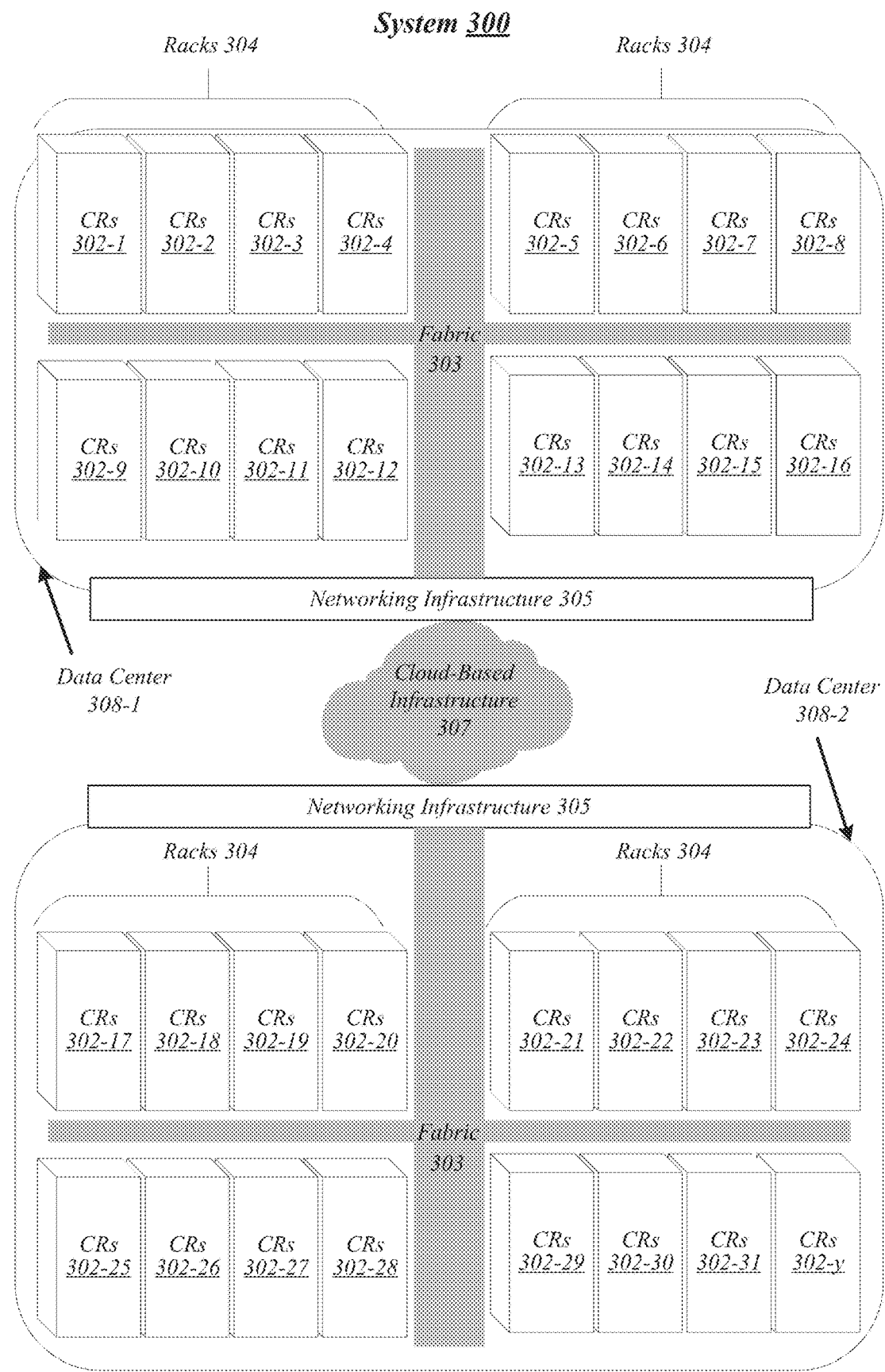
FIG. 3 illustrates an embodiment of a network that may generally be representative of a cloud-based computing system.

FIG. 3 illustrates a conceptual overview of a system 300 that may generally be representative of a distributed cloud-based computing system or another type of computing network in that one or more techniques described herein may be implemented according to various embodiments. As shown in FIG. 3, system 300 may generally include computing resources (CRs) 302-y, where y may be any positive integer, to compute information and data. The computing resources 302 may include resources of multiple types, such as—for example—processors, co-processors, fully-programmable gate arrays (FPGAs), memory, networking equipment, circuit boards, storage, and other computing equipment. The embodiments are not limited to these examples.

The computing resources 302 may be included as part of a computer, such as a server, server farm, blade server, a server sled, or any other type of server or computing device, and may be within one or more racks 304. In embodiments, the racks 304 may be part of one or more data centers 308 and may be coupled with each other via various networking equipment. For example, the racks 304 within a data center 308 may be coupled with each via a fabric 303. The fabric 303 may include a combination of electrical and/or optical signaling media, and high bandwidth interconnects, such as Gigabit Ethernet, 10 Gigabit Ethernet, 100 Gigabit Ethernet, InfiniB and, Peripheral Component Interconnect (PCI) Express (PCIe), and so forth. Further, the fabric 303 may include switching infrastructure, such as switches, routers, gateways, and so forth. The fabric 303 is configured such that any rack 304 may send signals to (and receive signals from) each other racks 304 within a data center 308 to communicate data and information. In embodiments, the fabric 303 may be coupled with networking infrastructure 305 such that it enables communication of signals between racks of one data center 308 with racks 304 of another data center 308 to communicate data and information. For example, FIG. 3 illustrates racks 304 of data center 308-1 coupled with racks 304 of data center 308-2 via fabrics 303, networking infrastructure 305, and the cloud-based infrastructure 307.

In embodiments, the networking infrastructure 305 includes networking equipment, such as routers, firewalls, switches, gateways, cabling, and so forth to communicate data and information between a data center 308 and with the cloud-based infrastructure 307 and another data center 308.

For example, the networking infrastructure 305 may include edge access routers, edge access switches, and edge firewalls capable of communicating with core routers, core switches, and core firewalls of the cloud-based infrastructure 307. The core networking equipment of the cloud-based infrastructure 307 may couple with edge networking equipment of another data center 308 to enable communication between data centers 308. Note that embodiments are not limited in this manner, and the networking infrastructure 305 and/or cloud-based infrastructure 307 may include other networking equipment, servers, relays, interconnects, and so forth to enable communication between a data center 308 and other data centers 308.

In one example, the system 300 may be a distributed cloud-based computing system to provide a financial service platform. The system 300 may process data and information, such as financial data and financial information, to provide financial services, for example. The financial services include, but are not limited to, investment and asset management services, active equity management services, active quantitative equity services, cash fund services, alternatives services, currency management services, index investing services, electronic trading services, multi-asset services, investment research services, investment trading services, accounting services, custody services, fund administration services, outsourcing services, performance measurement services, portfolio analysis services, data analytics services, investment analytics services, benchmark/indices/indicator services, D-as-a-Service (DaaS) services, and so forth. Embodiments are not limited to these examples. To provide these financial services, the system 300 may dynamically pool or compose a plurality of the computing resources 302 together within a data center 308 and/or among data centers 308 in the cloud via the cloud-based infrastructure 307. In one example, computing resources 302 of data center 308-1 may be composed with computing resources 302 of data center 308-2 to process data and information, e.g., a job, to provide a financial service. Once the job complete, the system 300 may decompose the composed computing resources 302 and make the computing resources 302 available to process another job. Note that in embodiments, the system 300 may enable multiple instances of pooled or composed computing resources 302 to provide data and information processing in parallel and embodiments are not limited in this manner.

In embodiments, system 300 may be coupled with one or more other systems, such as investment trading systems, banking systems, regulatory systems, risk management systems, performance systems, accounting system, data warehouse systems, financial institution system, and so forth. These other systems may be coupled with system 300 via networking, such as the networking infrastructure 305 and the cloud-based infrastructure. Embodiments are not limited in this manner.

Figure 4:
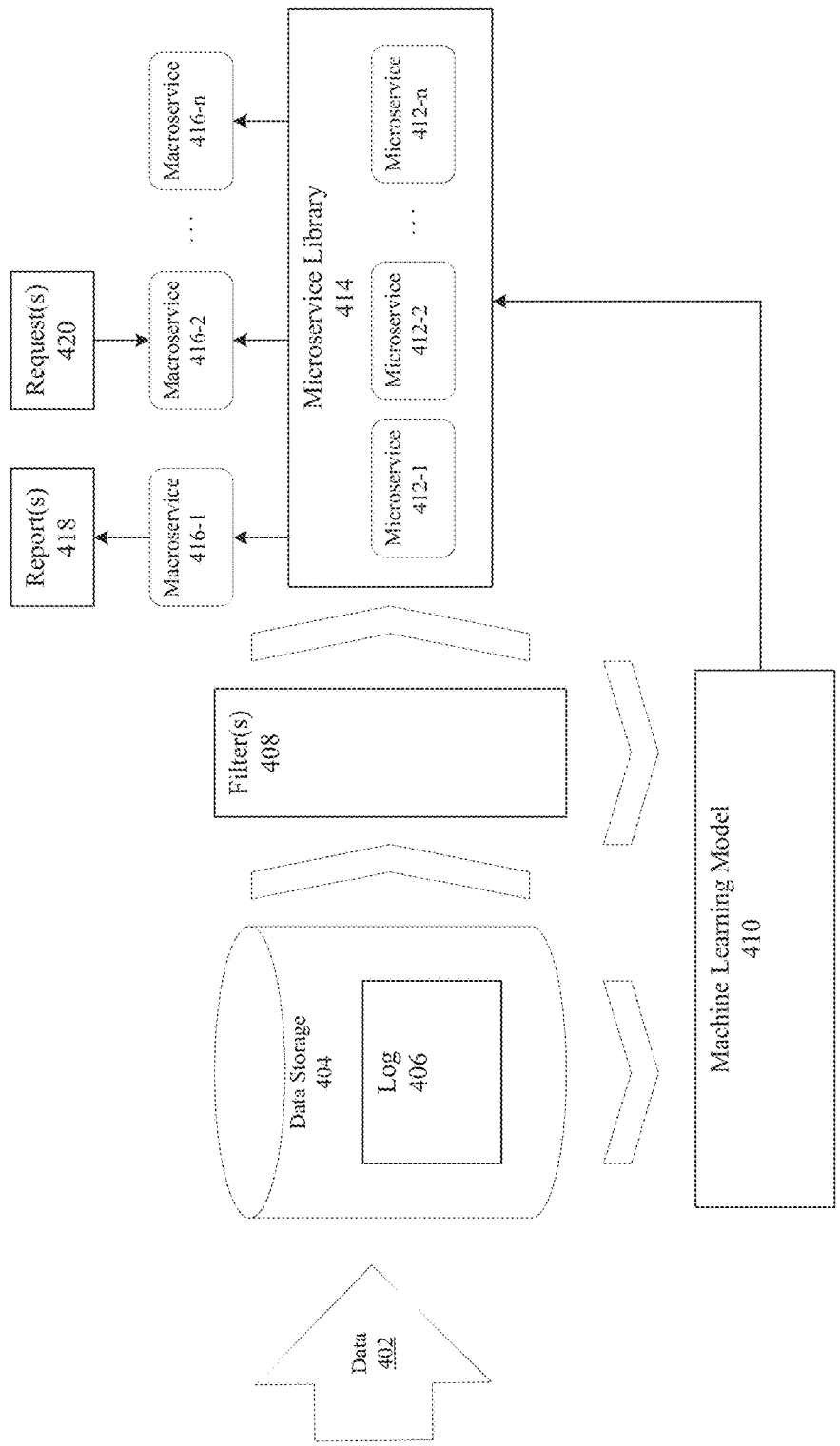
FIG. 4 depicts a block diagram describing exemplary logic and data flows through a computing architecture.

FIG. 4 depicts a block diagram describing exemplary logic and data flows through a computing architecture.

Data 402 may be received in a data storage 404. The data 402 may include discrete units of data and/or one or more data streams (e.g., communication channels that repeatedly provide one or more data units at a given rate). The data 402 may include, for example, data relating to an individual user (e.g., a financial client), aggregate data (e.g., reflecting conditions in a market, such as a financial market), cancelations of previously-received data, corrections of previously-received data, etc. In some cases, cancelations and/or corrections may be received that cancels or corrects other data items that have not yet been received (e.g., due to the order in which the data was transmitted or batched, network conditions, data losses, etc.).

The data storage 404 may include hardware, software, or a combination of hardware and software suitable for storing data. The data storage 404 may include one or more data structures, such as a log 406 or a database. The data structures may be configured to store and organize the data, and/or to facilitate retrieval of the data. In some embodiments, the log 406 may be organized chronologically (e.g., in the order in which the data 402 was received by the data storage 404, in a time-stamp order of the data 402, etc.). In some embodiments, the log 406 is a persistent and/or immutable log which allows individual data records to be written, but not to be directly deleted or changed.

In some embodiments, the data 402 stored in the data storage 404 may be subjected to one or more filters 408. The filters 408 may include data governance filters which, for example, match one or more rules against the data 402 and selectively pass the data 402 to other components in the architecture.

The data storage 404 and/or the filter(s) 408 may provide information to a machine learning model 410, such as an artificial neural network (ANN). The underlying model 410 may be configured to learn associations from patterns in the data 402, to predict future trends based on historical data observations, and to provide insights into why the data 402 appears the way that it does.

A library 414 of microservices 412-$i$ may make use the data (e.g., the raw data stored in the data storage 404, the filtered data as presented by the filters 408, information output from the machine learning model 410, or various combinations of these types of data). Each microservice 412-$i$ may represent an atomic computing unit configured to perform a defined task (e.g., computing a value for a financial variable for certain subsets of the data 402). The microservices 412-$i$ may be used individually, or variously combined into macroservices 416-$i$. The macroservices 416-$i$ may represent more complex operations in which the outputs of various microservices 412-$i$ are combined or otherwise used to perform a specified task.

For instance, one macroservice 416-1 may use the outputs of various microservices 412-$i$ to generate a report 418 (such as a financial report, disclosure form, etc.). In another example, an entity (such as a financial regulator) may issue a request 420 via a macroservice 416-2, and the microservice 416-2 may perform various operations to comply with the request (e.g., calling on another macroservice 416-1 to generate a report responsive to the request 420, correcting data 402 in the data storage 404, etc.). In some embodiments, macroservices 416-$i$ may themselves be combined together to form other macroservices 416-$i$.

The microservices 412-$i$ and/or the macroservices 416-$i$ may be exposed to a third party (e.g., by use of an application programming interface, or "API"). In some cases, a single entity may provide the microservices 412-$i$ and the macroservices 416-$i$. In other cases, one entity may provide the library 414 of microservices 412-$i$, and another entity may use the microservices 414 to generate their own customized macroservices 416-$i$.

The machine learning model 410 may be generated and/or refined via a machine learning process, such as the one depicted in the flow chart of FIG. 4. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Figure 5:
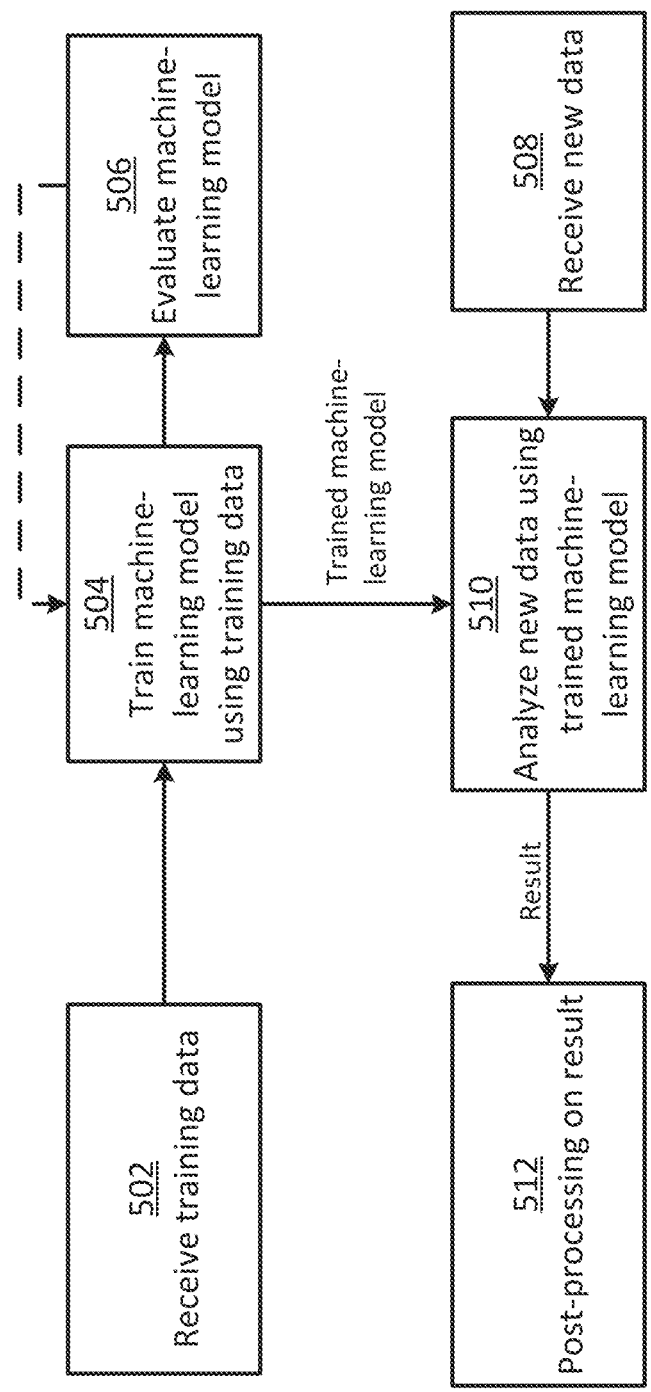
FIG. 5 is a flow chart illustrating training and using a machine-learning model.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 5.

In block 502, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 504, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 506, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 504, where the machine-learning model can be further trained using additional training data or otherwise modified to improve accuracy. If the machine-learning model has an adequate degree of accuracy for the particular task, the process can continue to block 508.

In block 508, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 510, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 512, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
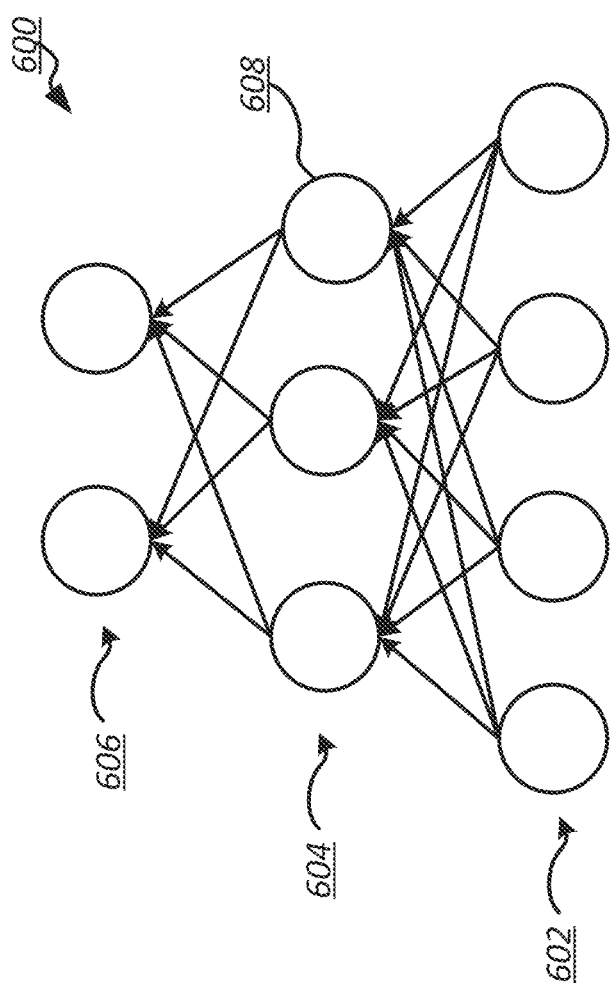
FIG. 6 illustrates an example of a machine-learning model that is a neural network.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600.

In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation: y=max(x, 0) where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications system discussed herein.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 7:
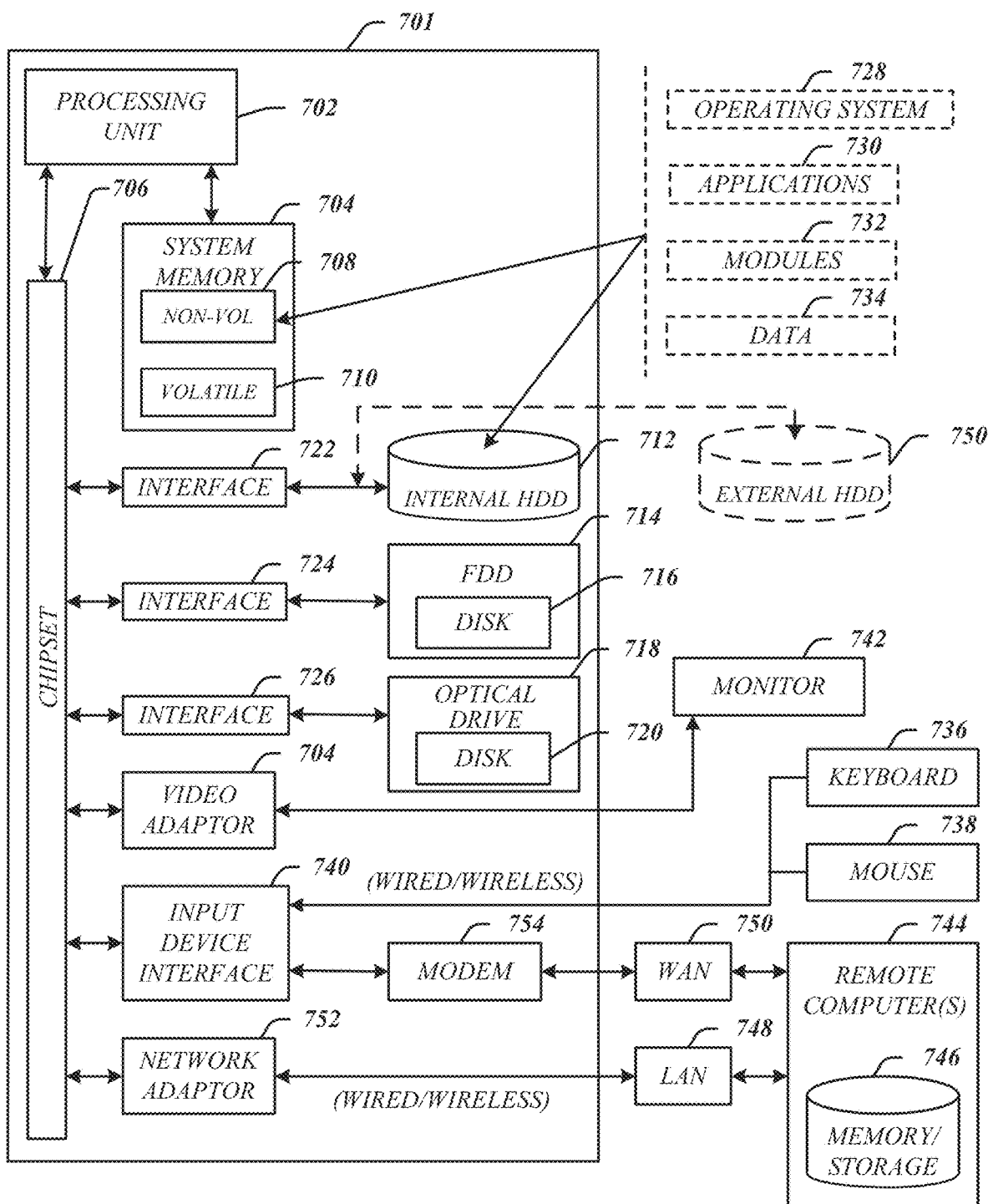
FIG. 7 illustrates an embodiment of a computing architecture.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 702.

In some embodiments, the processing unit 702 couples with the chipset 706 via a highspeed serial link and couples with the system memory 704 via a highspeed serial link. Each highspeed serial link is an example of a bus structure. In other embodiments, the processing unit 702 may couple with the chipset 706 and possibly other processor units via a system bus and may couple with the system memory 704 via the chipset 706. In further embodiments, the processing unit 702 and the chipset 706 may reside in a System-On-Chip (SoC) package.

The chipset 706 provides an interface for system components including, but not limited to, the system memory 704 to the processing unit 702. The chipset 706 may couple with any of several types of bus structure that may further interconnect to a memory bus (with or without a memory controller), a peripheral bus, and a local bus using any of a variety of commercially available bus architectures. Interface adapters 722, 724, 726, 728, 740, 752, etc., may connect to the chipset 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components described herein.

A user may enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Some aspects may utilize the Internet of Things (IoT), where things (e.g., machines, devices, phones, sensors) can be connected to networks and the data from these things can be collected and processed within the things and/or external to the things. For example, with the IoT, sensors may be deployed in many different devices, and high-value analytics can be applied to identify hidden relationships and drive increased efficiencies. This can apply to both Big Data analytics and realtime (streaming) analytics.

Some systems may use Hadoop®, an open-source framework for storing and analyzing big data in a distributed computing environment. Apache™ Hadoop® is an open-source software framework for distributed computing. For example, some grid systems may be implemented as a multi-node Hadoop® cluster, as understood by a person of skill in the art. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction.

Immutable Logs

As described above, conventionally transaction data is stored in a database which is updated as the data entries are subsequently changed or corrected. This, however, leads to problems when different users querying the database cannot agree on the state of the data because they each can receive different responses when asking the same question.

At one point, such an organizational structure for data storage made sense, because digital storage was limited and expensive; choices had to be made to simplify data storage and increase storage efficiency. However, with new innovations in storage capabilities, data storage capacity has become significantly greater in recent years. Nonetheless, the earlier storage paradigm of updating data in place has not generally been abandoned.

In order to address these (and other) problems, a data storage system based on immutable logs implemented as a persistent relational database (or databases) is proposed and described below. The immutable logs have several characteristics making them particularly well-suited to storing transactional data.

Logs are records of data received by a system, typically ordered sequentially such that entries are added to the log as new data arrives. Entries, though stored in the sequential order in which they were received, may be backdated. For example, an entry may be received at 9:59, and a second entry may be received at 10:00 indicating that a trade occurred at 9:58. The log would typically include the entry received at 9:59 first, and the entry received at 10:00 second, despite the fact that the 10:00 entry referenced a trade made at 9:58, before the first entry.

Thus, a log may be a kind of ledger of transactions. An immutable log is a log in which the entries, once made, are never changed. Although cancellations and corrections of entries may be accommodated, as described in more detail below, the original entry remains in place, unchanged.

A relational database is a database in which data is organized according to the relational model. According to exemplary embodiments, a relational database may be arranged into one or more tables including rows and columns. Rows may represent records identified by a unique key. Columns may represent attributes describing the entry in each row. A database may be made persistent by storing entries using functional persistent data structures (e.g., data structures that can neither be changed nor deleted).

Different tables may be connected to each other based on relationships between the tables. For instance, one table may represent a given entity type (e.g., customers), with attributes describing different parameters relating to that entity type (e.g., name, age, net worth, etc.) A second table may represent another entity type (e.g., stock trades), with attributes describing parameters relating to that different entity type (e.g., date/time of trade, trader identity, security being traded, amount of security being traded, whether the trade is a buy or sell, etc.). These two tables may be related to each other in that the trader identity in the second table may refer to a customer in the first table. Meanwhile, the net worth of a particular customer in the first table may depend, in part, on the transactions in the second table for which the customer is identified as the trader.

Applications may access data in the tables by querying the relational database. Because an immutable log stored as a relational database is immutable, all information pertaining to data entries is maintained, which means that responses to queries can be made consistent (e.g., different users can structure queries such that everyone will agree on what they saw as of a given time, regardless of when they issued their query). Returning to the example provided in the Background, above, a second user querying the database for the first user's trade history could ask what the first user's net worth would have been when viewed on January 1. In this case, the system would examine all the user's transactions through January 1, revealing that the first user's statement would have reflected −10 shares of XYZ corp. This is referred to as an "as-of" query, which returns data that has been committed up to a point in time specified in the query.

The second user could alternatively specify that they were interested in what the first user's actual net worth was, as modified by any subsequent cancellations or corrections. This is referred to as an "as-at" query, which returns data that has been committed up to the point in time specified in the query, and further searches forward from that point in time to determine if cancellations or corrections were made.

In this case, a second user querying the first user's net worth as-at January 1 would see −10 shares of XYZ Corp. at 9:59 on January 2, and would see the first user's net worth as-at January 1 as including +10 shares of XYZ Corp. after 10:00 on January 2.

Optionally, the query may also specify a time range for which cancellations and/or corrections will be taken into account (e.g., only account for cancellations or corrections issued within 30 days, five years, etc., of the transaction date). This allows the process of performing calculations based on data in the immutable log to be simplified, saving processing resources. In many real-world scenarios, a user querying the database is interested in a particular time frame (e.g., for purposes of performing an audit or risk assessment), or an organization or entity may limit the time period in which corrections can be made. Hence, taking these limitations into account may allow for simpler calculations by limiting the amount of data that needs to be searched.

Because of the immutable nature of the data, the response to the as-of query never changes regardless of when the query is issued. This makes as-of queries useful for auditors and others who are interested in what information was available to the first user, regulators, a bank, etc. at a given time. On the other hand, there are situations in which a user is not particularly interested in identifying information that may be incorrect (e.g., if the first user wants to know what their net worth was on January 1, they are probably not interested in seeing data that has subsequently been corrected due to mistakes). In such a case, an as-at query can be used, with the understanding that such a query only reflects cancellations and corrections that have been received as of the time that the query was issued.

In summary, the immutable log represents a place to store data, that is immutable and a log, that can compute intermediate results, where each observer can agree on the state of the data, that is queryable using arbitrary, ad hoc queries, that can be corrected, and that can be forked to examine alternative scenarios. These and other aspects are described in more detail below.

Figure 8A:
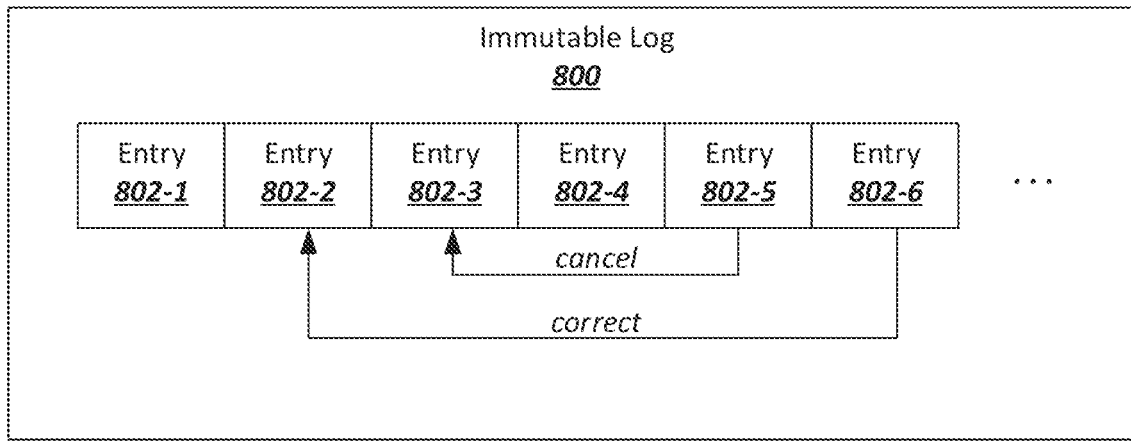
FIG. 8A depicts a conceptual view of an immutable log according to an exemplary embodiment.

Turning to FIG. 8A, an exemplary conceptual view of an immutable log 800 is depicted. The immutable log 800 includes a number of entries 802-*i*. Each entry may include information (e.g., data relating to a transaction), such as entry 802-1.

Alternatively or in addition, entries may be cancellations of other data. For example, in FIG. 8A, entry 802-5 cancels entry 802-3. This may be represented with a pointer (e.g., entry 802-5 may point back to entry 802-3 with an indication that entry 802-5 represents a cancellation). The canceled entry remains in the log (hence, entry 802-3 is not deleted).

Still further, entries may be corrections of other data, which amend some of the information from a previous entry. For example, in FIG. 8A, entry 802-6 corrects entry 802-2. This may be represented with a pointer (e.g., entry 802-6 may point back to entry 802-2 with an indication that entry 802-6 represents a correction and indicating the new value for the data). The corrected entry remains unchanged in the log (hence, entry 802-2 is neither deleted or changed).

Note that, because the immutable log 800 is a log which records data as it is received, it is possible that cancellations or corrections may refer to entries that have not yet been received (e.g., if a transaction is executed but cancelled immediately, the cancellation could arrive at the system maintain the immutable log 800 before the transaction, due to network latency or other factors). In this case, the cancellation or correction pointer would refer to an entry that occurs later in the log 800.

Thus, the immutable log 800 represents a kind of ledger or transaction tape, which can be played back to show the state of the world represented by the entries 802-$i$ at any given point in time. The log 800 can also be searched to determine if any of the data in a time period of interest has been corrected or canceled. As noted above, because cancellations or corrections may arrive out-of-order with the data that they correct, such a search may proceed in the backwards or forwards direction. As further noted above, such a search may be time-limited to make the search more efficient. Furthermore, as will be described in more detail in connection with FIG. 10, a corrections log or table may be stored on the side, providing a searchable shorthand version of the immutable log 800 that can facilitate updating data in response to queries or data derivation.

Figure 8B:
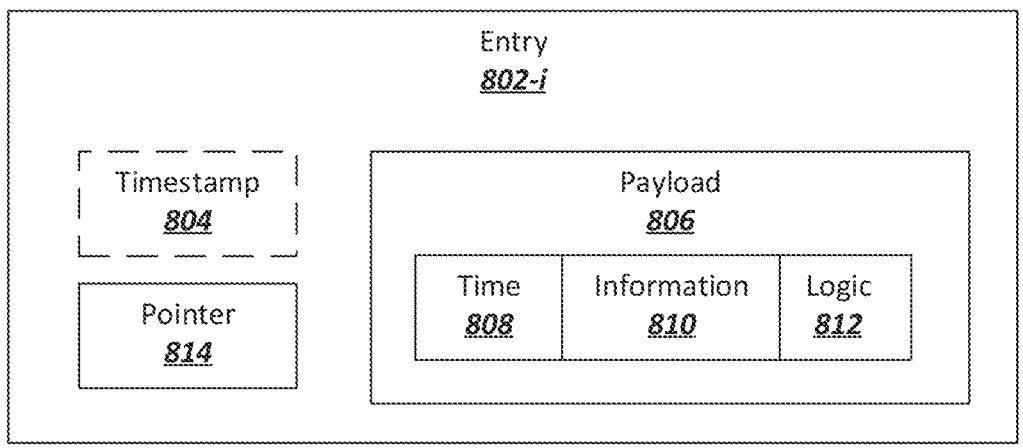
FIG. 8B depicts a structure for an entry stored in the immutable log.

FIG. 8B depicts an exemplary entry 802-$i$ for use in the immutable log.

The entry 802-$i$ may optionally include a timestamp 804, indicating the time that the data was received by the system maintaining the log 800 (or, alternatively, identifying a time at which the underlying transaction occurred). As such, the timestamp 804 may be applied by the originator of the transaction resulting in the entry 802-$i$ (e.g., a user terminal) or by the entity maintaining the log 800 (e.g., a server that receives the transaction data for logging purposes). If the timestamp 804 represents the time at which the transaction was received at the log 800, the entries 802-$i$ of the log may be added to the log in the order indicated by the timestamp 804.

Alternatively or in addition, the time of receipt or the time that the transaction occurred may be stored as a time field 808 in the payload 806 of the entry 802-$i$. The payload 806 contains any information pertaining to the transaction. For example, if the transaction represents a stock trade, details of the trade (e.g., trader identity, security being traded, amount of the trade, etc.) may be stored in an information field 810 in the payload 806.

Figure 9A:
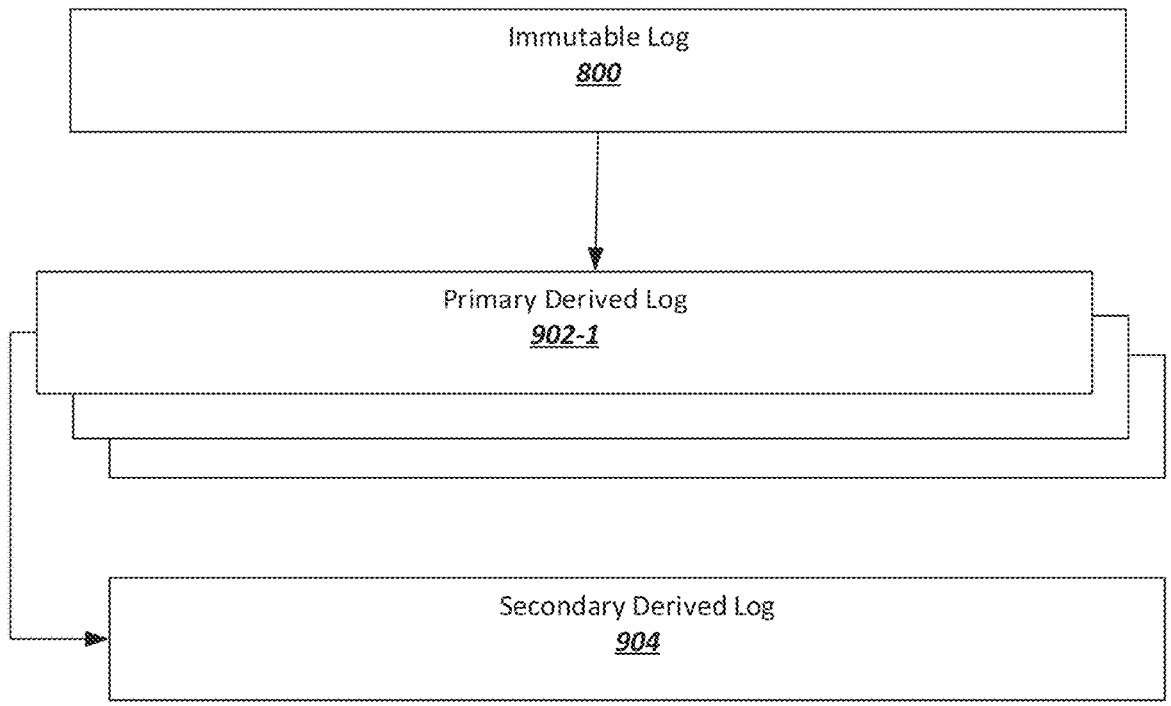
FIG. 9A depicts exemplary derived logs that result from calculations or logic performed on the entries in a primary immutable log.
Figure 9B:
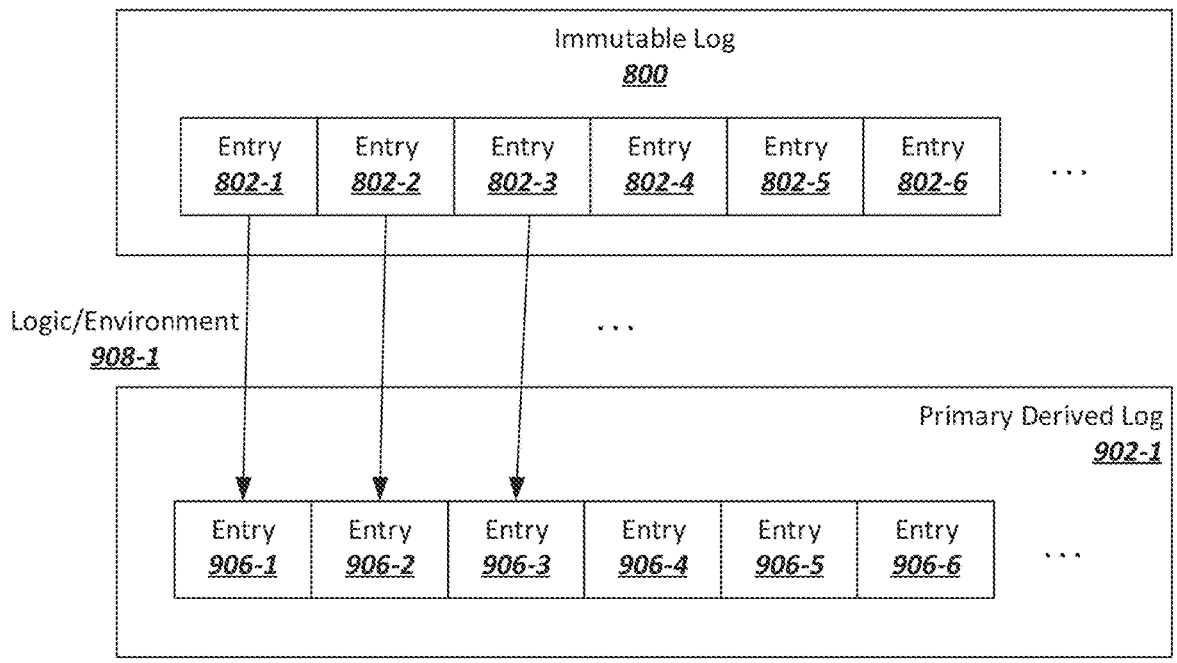
FIG. 9B shows how logic interacts with the entries in the primary immutable log to derive the data stored in the derived logs.

If the information 810 in the entry is derived information (e.g., derived from information in another log or tape, as described in FIGS. 9A-9B), then the logic 812 used to create that derived information may also be stored with the entry 802-$i$. The logic 812 may include, for example, an identification of computer code and/or system information used to generate the information 810; in one embodiment the logic 812 may be represented as a git hash. It may be important to store information relating to the system generating the information, because the same logic may be processed differently by different systems (e.g., depending on how the systems handle floating point numbers).

Optionally, the object representing the entry 802-$i$ may also include one or more pointers 814, representing places where other information about the current object is stored. The pointer 814 may be a fat pointer, which includes the location in memory in which the data is stored and may also include other information. Upon creating an object representing an entry 802-$i$, the system may return a fat pointer to the object. The pointer 814 may be a null pointer, for example if no other object has yet been created that cancels or corrects the current object. If another object has been created that cancels or corrects the current object, a pointer to the cancellation or correction may be stored in the pointer field 814. The use of such pointers is described in more detail in connection with the relational database depicted in FIGS. 11-12D.

Each entry 802-$i$ may be represented as an object, and each entry 802-$i$ has an identity defined by the various fields contained within the entry 802-$i$. For example, a one-way hash of the object may be computed over any or all of the timestamp 804 and/or the payload 806 fields. The hash may become a unique or semi-unique identifier capable of identifying the entry 802-$i$.

Because each object has a unique identifier, the identifier can be used to sign the object, encrypt the object, or perform access control for the object. Thus, the system may encode the entry 802-$i$ cryptographically (e.g., using a one-way hash, such as SHA-1), in part so that the information cannot be changed. A storage backend may map the hash to byte arrays representing the object. In order to implement immutability, the keys may be maintained in perpetuity. However, in some cases, an entity may wish to purge an old log (e.g., due to court requirements, privacy requirements, data maintenance procedures, etc.). In this case, instead of deleting the old data, the data may simply be encrypted with a key and then the key may be deleted. This accomplishes the same result (of rendering the data inaccessible), but may be simpler or more efficient to do mechanically.

In some embodiments, immutability may also be achieved or facilitated by selecting a suitable programming language, such as a language in which variables are not changed in place. When a value in an object is changed, a new object identifier is generated (e.g., the changed object represents a different object from the original object).

In some embodiments, the immutable log 800 may be configured to store raw data as that data is received. However, a mechanism to compute derived information from the raw data may also be helpful. For example, if the immutable log 800 receives data on financial transactions related to one or more customers, one of those customers may be interested in knowing how their net worth changes over time as a result of the transactions. This derived data may, itself, be important to preserve—for example, a regulator may wish to be able to identify what a customer's net worth was at a given time (e.g., subject to subsequent cancellations and corrections) and/or what a user querying the database at a given time would have perceived the customer's net worth to be (e.g., not subject to cancellations or corrections that had not yet arrived as of the time of the query). FIG. 9A provides a conceptual view of an embodiment that allows such derived data to be computed and stored.

In this example, the immutable log 800 represents a sort of tape including raw facts and is configured as a persistent relational database. Information may be derived from the raw facts and stored in one or more derived logs 902-$i$. The derived logs 902-$i$ may themselves be immutable logs configured as persistent relational databases. In some cases, further information may be derived from the data in the derived logs 902-$i$. For example, if the primary derived log 902-1 represents a customer's net worth, a secondary derived log 904, itself derived from the primary derived log 902-1, could represent the daily change in the customer's net worth.

In some embodiments, a service may be provided that listens, or otherwise registers to receive, events on the immutable log 800 or a derived log 902, 904, etc. These services may be, for example, the microservices described above. Based on the information received by the service, the service may compute a value (which may be stored in a derived log that is derived from the log to which the service is listening). A user may subscribe to the service, or multiple services, to receive the computed values (assuming that the user is authorized to view the derived data and/or the original events). This would allow, for example, for real-time reporting of a user's net worth or other calculated information.

Certain types of calculations may be special cases that can be handled more efficiently by exploiting certain characteristics of the calculation. For example, addition and subtraction can be performed in any order while giving the same result. Thus, an addition/subtraction service can simply work through the entries in a log in order and yield a final answer. If a subsequent entry is a cancellation or correction, a suitable addition/subtraction operation can be performed by the service to reverse or amend the total. Addition and subtraction operations are common in financial transactions, where most events will be buys and sells of certain securities (although multiplication and division may be possible, for example in the case of stock splits). Each time an addition/subtraction operation is performed on a log (or under certain circumstances, such as a tally performed at the end of the day), the service may compute a value and store the value in a derived log. When a future request comes in at a later time, the service may pick up the calculation from the value stored in the derived log, thus avoiding the necessity to recompute the value from the main log. Such a strategy could also be used to correlate a sell order for a particular security with an earlier buy order using a given strategy (e.g., "last in—first out," "first in—first out," maximizing gains or losses, etc.).

According to some embodiments, processing of cancellations and/or corrections may be made more efficient by generating a new derived log with corrected data (i.e., with the corrections and/or cancellations already accounted for among the entries 906-$i$ of the derived log). In this way, if a query is received in which the cancellations and/or corrections should be incorporated into the data (e.g., the above-described as-at query), the derived log may be consulted instead of the original log.

Another way to make queries more efficient when cancellations and/or corrections are possible is to restrict cancellations and corrections to a limited time. For example, a restriction may be put in place such that cancellations and/or corrections cannot affect an entry more than a predetermined point in time (e.g., one month, one year, etc.) in the past. When combined with the above-described derived log, the derived log may be generated only for the time period in which cancellations and/or corrections are permitted.

According to some embodiments, entries (original entries 802 and/or derived entries 906) may optionally be tagged with certain characteristics. For example, entries associated with a particular trader may be tagged to that trader to facilitate queries about that trader's performance. Another use case for tagging may be to tag suspect transactions that are likely to be subject to future cancellation or correction. Machine learning algorithms may be applied to identify entries that are likely to be subject to cancellation or correction. In some cases, these algorithms may predict the degree and direction to which the entry is likely to be corrected.

When deriving data, if appropriate, speculative execution may be applied to entries tagged in this manner. For example, if an entry is flagged as likely to be canceled, a service may calculate the derived value with the data including the original entry and/or with the data excluding the original entry. Similarly, if an entry is flagged as likely to be corrected, the service may calculate the derived value with the original entry and/or with the predicted corrected entry. In some embodiments, if conditions permit, a scheduled calculation may be deferred for a limited amount of time with the expectation that the data will be corrected and/or canceled. The limited amount of time may be determined by appropriate machine learning algorithms.

Speculative execution may be applied in other contexts, as well. For example, a query may specify predicted or future conditions that may be used to modify the data in the logs for purposes of the current query. For instance, a user may predict that a financial market will rise or fall on a given day, and may query as to how this would affect the value of their portfolio. Similarly, conditions can be applied to historical data (e.g., "what if I had purchased X shares of company Y one year ago?"). These conditions may be applied as overlays on top of raw events stored in the logs.

For some purposes it may be important to preserve, not only the derived data, but also information about the processes and systems that resulted in the derived data in the first place. FIG. 9B depicts an example in which logic is applied in a particular environment to derive entries 906-$i$ from original data 802-$i$ in an immutable log 800. Preservation of the logic and/or environment information 908-$i$ may be achieved, for example, by storing a git hash or other identifier of the logic in a derived log, by storing the code itself in the derived log, by storing a machine image in the derived log, etc.

In this way, the derived log can be recreated from the log that the data was derived from. Moreover, with the logic and system information preserved, it is possible to determine how certain derived data was arrived at. For example, if a certain calculation yields an unexpected result, the logic and/or system information can be checked to determine why the result was not as expected (e.g., due to bugs, due to the way that numbers are represented, etc.).

One example in which it might be desirable to preserve the logic/environment information 908-$i$ is when the immutable log 800 includes information (i.e., data items) used to calculate a financial fund's net asset value (NAV). Traditionally, a NAV is calculated at the end of a day, and then that NAV is used as the basis for trading the fund on the following day. A mistake in NAV computation discovered the following day (or later) cannot be directly corrected, because the mistake has already had an impact. Instead, the error may be addressed through a side-band mechanism. If the error was due to a bug in the logic used to calculate the NAV, the error will be corrected for future NAV calculations; however, it may be important to preserve the flawed logic for auditing or other purposes.

In this example, the use of the immutable log 800 along with the capability of performing speculative execution, as described above, may simplify the calculation of the correction amount for the side-band mechanism: the log may be replayed from the previous day using the correct NAV, and the effect of the error can be measured by comparing the actual results over the course of the day (or any period of interest) to the historical results. The difference may be applied through the side-band mechanism.

As another example, issues related to incorrect or inaccurate NAV may be mitigated by approximation. An approximate computing engine, as described herein, may select a subset of the information (i.e., the data items) used to calculate the financial fund's net asset value (NAV) and calculate an approximate NAV. Therefore, the approximate computing engine described herein provides a benefit by predicting such the NAV with an acceptable level of precision.

Access rights may be enforced at the level of individual entries and/or at the log level. For example, a user may be provided with the rights to see entries in the immutable log 800 related to their account, but not to the accounts of other users. In another example, a user may subscribe to see a derived log which is dedicated to calculating the net worth of their accounts, but may be restricted from viewing a derived log dedicated to calculating the net worth of another user's account. In some embodiments, access rights defined at the entry level may carry through to logs that are derived from those entries—for instance, if a first user is not permitted to view an entry associated with a second user's account, the first user may also be restricted from viewing logs that are derived from the entry as well.

Figure 10:
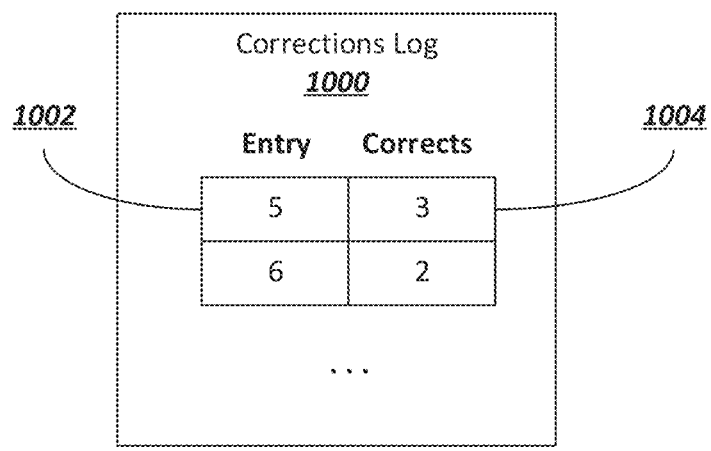
FIG. 10 depicts an exemplary corrections table used to identify which entries in an immutable log are corrections or cancellations of other data stored in the immutable log.

As noted above, when corrections/cancellations are applied, these may be stored in a corrections log, such as the corrections log 1000 depicted in FIG. 10. In this example, the corrections log 1000 identifies a correcting entry 1002 from the log and a corrected entry 1004 from the log. By providing this information in a separate corrections log 1000, any queries on the log in question can consult the corrections log 1000 to determine whether a particular entry is corrected by a subsequent entry. Thus, a service can avoid performing calculations on data that is subject to cancellation and/or correction elsewhere in the log. As a consumer of the data, a user and/or service may automatically subscribe the corrections log 1000 for a given log when subscribing to that given log.

Figure 11:
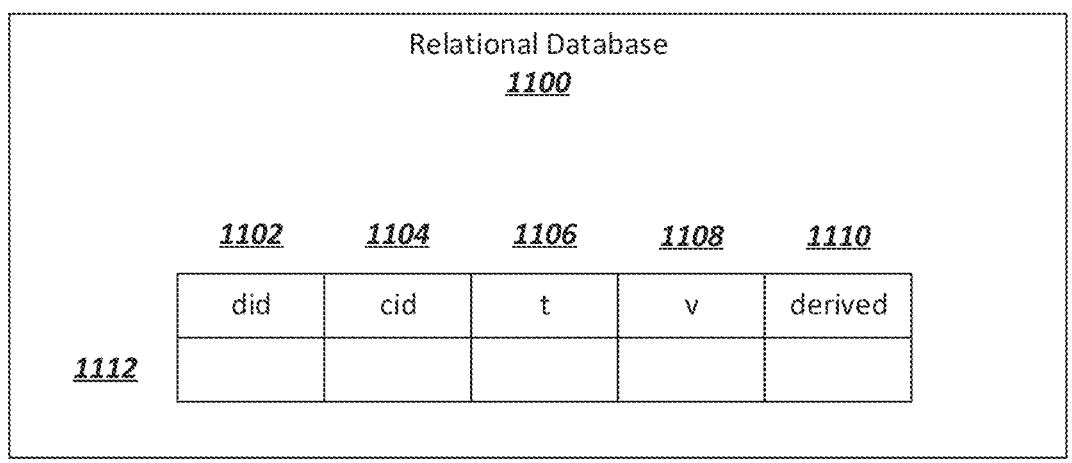
FIG. 11 depicts an exemplary relational database used to implement the immutable log.

The logs may be configured as a persistent relational database, such as the database 1100 depicted in FIG. 11. In this example, each entry is stored in a row 1112. The entry has various attributes; in this case, a deleter ID 1102, a creator ID 1104, a time 1106, a value 1108, and (optionally) a derived data field 1110.

The creator ID 1104 represents the unique identifier identifying the entry described in the current row 1112. In some embodiments, the creator ID 1104 may represent the order in which the entry was received at the log (e.g., a first entry may be assigned a value of 1, a second entry a value of 2, etc.).

The deleter ID 1102 represents a future entry that cancels or corrects the entry defined in the current row 1112. The deleter ID 1102 may be initialized to a default value, such as NULL (or, the examples depicted in FIG. 12A-12D, ∞). If the entry is never cancelled or corrected, the presence of this default value may indicate that the current entry should be used to determine the value of the variable associated with the entry. If the deleter ID 1102 of the entry has a value in it (representing the creator ID 1104 of the entry cancelling or correcting the value), then this value may be followed to a new entry, and the value defined in that entry may be used for the variable. If the entry is corrected or canceled again in the future, then the deleter ID 1102 of the new entry defining the initial cancellation/correction may be updated.

The time 1106 may represent the time at which the variable defined by the entry held the value in the value field 1108. The derived data filed 1110 may include a pointer to one or more derived logs including information relating to the current entry.

An example of the use of these fields is shown in FIGS. 12A-12D, in which different entries are received in an immutable log. At a time t=1 shown in FIG. 12A, a data point is received indicating that the value of a certain variable is 10. This entry is assigned a creator ID of 100 and added to the relational database 1100. The deleter ID is initialized to ∞, indicating that the entry is currently valid. Thus, if a user were to query for the value of the variable associated with the relational database 1100, the entry would indicate that, at time 1, the value was 10, that this value was established by the entry 100 received at the immutable log 800, and that the entry is currently valid.

Figures 12A, 12B:
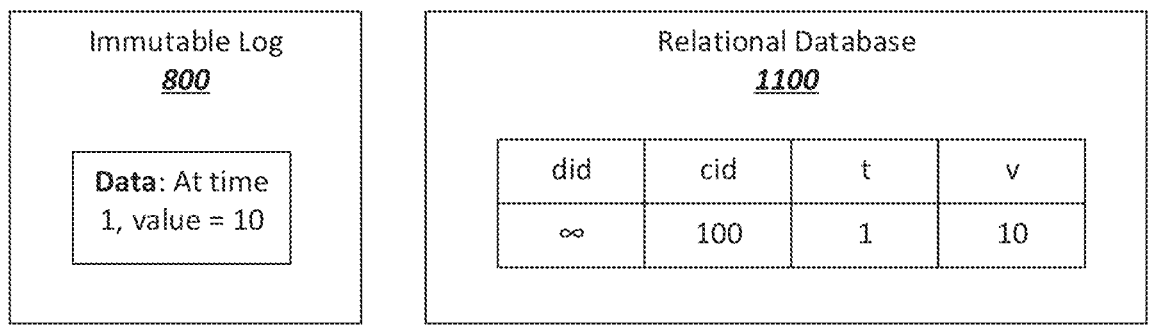

Similarly, in FIG. 12B, the value of the variable is 20 as established by the entry having the creator ID 110, with the variable value having been established at time 2.

For example, if the immutable log 800 represents buys and sells of a given security, then these entries might indicate that 10 shares were purchased at time 1, and 20 shares were purchased at time 2.

In FIG. 12C, a third entry is received (having creator ID 120), which corrects the value at time 1 (i.e., the value that was initially established by the entry 100) to 8. This might indicate that, for example, 10 shares were not traded at time 1, but rather 8. Accordingly, the deleter ID associated with the entry having creator ID 100 is set to 120, and a new entry is added for the creator ID 120. Thus, when querying the database 1100, a user interested in the value of the variable at time 1 could follow the deleter ID from the first entry 100 to the update specified by creator ID 120. If a query were received asking for the value v at time 1, accounting for all subsequent cancellations and corrections, then the value defined by creator ID 120 would be retrieved (i.e., v=8). If, on the other hand, a query were received asking for the value at time 1 as established by entries up to the one defined by creator ID 110, then it could be readily identified that the update to the entry associated with creator ID 100 (i.e., entry 120) is too late for the purposes of the query, and hence the value v=10 would be returned.

FIG. 12D depicts an example in which a fourth entry having creator ID 130 is received, further correcting the value at time 1 to v=5. As can be seen, the deleter ID associated with the first entry (having creator ID 100) remains as 120. However, the delete ID for the entry having creator ID 120 is updated to 130. Now, the chain of updates can be followed from CID 100 to CID 120 to CID 130, with appropriate results returned depending on the time period specified by the query.

Using the structure depicted in FIG. 11, the data can be readily queried by simply appending an instruction or condition to the query, specifying that only results that have been created within the time limits identified by the query (using the time field 1106), which has also not been cancelled or corrected within the time limits specified by the query (using the deleter ID 1102 and the time field 1106 associated with the deleter ID 1102), should be returned. Of course, different conditions may be applied depending on whether the query is an "as-at" or an "as-of" query. An as-of query may follow the trail of the deleter ID 1102 only up to the end time specified in the query; an as-at query may follow this trail beyond this point, to incorporate all subsequent changes to a given entry.

Figure 13:
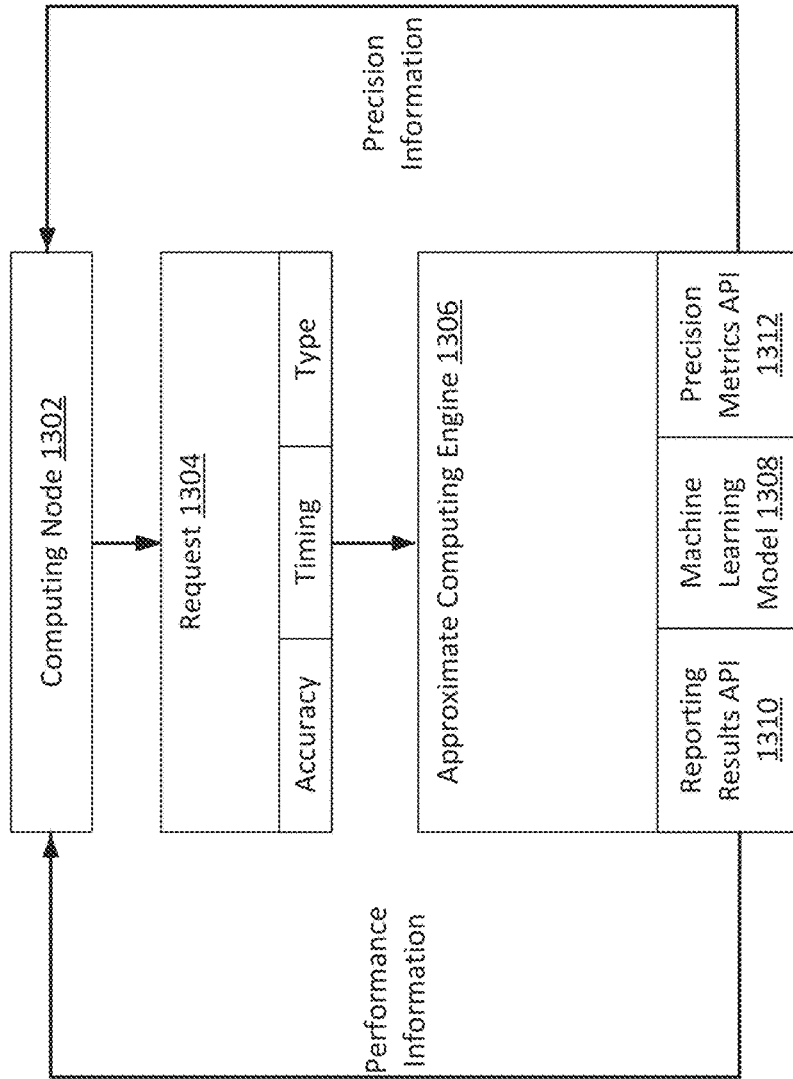
FIG. 13 illustrates an embodiment of a system.

FIG. 13 illustrates a block diagram for a system 1300 to increase a speed at which the financial information is produced such that it can provided in real-time or near real-time. In one embodiment, the system 1300 may comprise one or more components. Although the system 1300 shown in FIG. 13 has a limited number of elements in a certain topology, it may be appreciated that the system 1300 may include more or less elements in alternate topologies as desired for a given implementation. The system 1300 may include a plurality of computing nodes, an exemplary one of which is illustrated in FIG. 13 as computing node 1302. The computing node 1302 may be generally operative to interact with one or more components or modules within system 1300. The computing node 1302 may include one or more processing units, storage units, network interfaces, or other hardware and software elements, described in more detail below.

In an embodiment, the computing node 1302 may comprise a device, such as a server, comprising a network-connected storage device or multiple storage devices, such as one of the storage devices described in more detail herein. In an example, the computing node 1302 may include one or more devices used to access software or web services provided by a server. For example, the computing node 1302 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a wearable computing device such as a smart watch, a server, a server array or server farm, a web server, a network server, an Internet server, a work station, a mini-computer, a mainframe computer, a supercomputer, a network appliance, a web appliance, multiprocessor systems, processor-based systems, or any combination thereof.

In some embodiments, the system 1300 includes an approximate computing engine 1306 having a computing device such as a server, which may be generally operative to interact with one or more components or modules within a cloud-based service. The approximate computing engine 1306 may include one or more processing units, storage units, network interfaces, or other hardware and software elements, described in more detail below.

In various embodiments, the computing node 1302 and the other components of system 1300 may comprise or implement multiple components or modules. As used herein the terms "component" and "module" are intended to refer to computer-related entities, comprising either hardware, a combination of hardware and software, software, or software in execution. For example, a component or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 1300, and components and/or modules within a device of system 1300, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of non-transitory signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the components and modules of the system 1300 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In an embodiment, the computing node 1302 may include one or more computing modules associated with banks, customers, or other financial entities that may participate in trading positions in a market, such as the foreign exchange market. Rather than conventional solutions where important control values are not provided in real-time and are technologically difficult to produce, components of the computing node 1302 avail themselves of technology that rapidly produces these important control values without sacrificing precision. In some embodiments, these control values trigger responses by the computing modules associated with the banks, customers, or other financial entities being managed by the computing node 1302. Upon communication of the control value by the approximate computing engine 1306, an Application Programming Interface (API) implemented by the computing node 1302 executes functionality affecting the banks, customers, or other entities. As an example, a control value (e.g., the Net Asset Value or NAV) may cause the computing node 1302 to instruct a financial entity to make certain trading orders, including a purchase or a sale of fund.

As illustrated in FIG. 13, the computing node 1302 communicates a request 1304 for those important control values to the approximate computing engine 1306. The approximate computing engine 1306 may form part of a cloud computing environment, such as a private cloud computing environment. In this capacity, the approximate computing engine 1306 operates a service (e.g., a private cloud service or micro-service) for the computing node 1302 such that the request 1304 is operative to invoke functionality provided by the approximate computing engine 1306.

The request 1304 may include one or more attributes and, as illustrated in FIG. 13, the one or more attributes may include an activity, a timing, and an accuracy. The approximate computing engine 1306 may include various computing modules that operate to predict the above-mentioned important control values such that they are produced in real-time. Any prediction computed by the approximate computing engine 1306 provides real-time and accurate to the moment insight into an aspect of one financial portfolio. The approximate computing engine 1306 may set precision thresholds (85%) or time limits (e.g., two (2) minutes) and return with precise, but not perfect, predictions. Other than the Net Asset Valuation (NAV) as an example control value, other specific applications for banking and finance include, but are not limited to, loan rates, CDs, ratings, and/or the like. It is appreciated that the request 1304 is not limited with respect to a control value type. Once the computing node 1302 is provided with an approximation of the control value that is precise and in substantially real-time, techniques involving software to hardware may be employed to enhance business operations.

The approximate computing engine 1306 may include several sub-components, such as a machine learning model 1308, a reporting results application programming interface (API) 1310 and a precision metric application programming interface (API) 1312, to return various data. For instance, FIG. 13 illustrates the reporting result API 1310 as a sub-component configured to return performance information regarding the financial portfolio that is the subject of the request 1304. As described herein, this performance information may include the Net Asset Value (NAV) or another important control value as well as any other reportable statistic indicating performance. The precision metrics API 1312 illustrated in FIG. 13 includes precision metrics to evaluate the performance information's accuracy and return an evaluation in the form of precision information. The machine learning model 1308, as illustrated in FIG. 13, predicts the performance information provided by the reporting result API 1310 and evaluated by the precision metrics API 1312 into the performance information.

A precision metric, in general, may configure a range of actual range of control values and determine a likelihood that an approximation of an actual or current control value falls within that range. As described herein, that likelihood is determined by the number of data items used for computing the control value and/or the machine learning model 1308. The number of data items may be determined by the one or more attributes of the request 1304, including the accuracy attribute or the timing attribute. The precision metric may also establish a threshold (e.g., a minimum) for the likelihood with respect to triggering execution of a business decision (e.g., a purchase or a sale of a fund).

The following description relates to the Net Asset Valuation (NAV). According to one embodiment, computation of the Net Asset Valuation (NAV) involves a number of variables and the computing node 1302 utilizes a number of computing modules to produce values for these variables. Such values may include stock values that arrive sporadically and/or are delayed. The approximate computing engine 1306 may compute values predicting the NAV in spite of such sporadic arrivals and/or delays. In one exemplary embodiment, the approximate computing engine 1306 returns a predicated value for the NAV if that predicated value is deemed to be sufficiently precise.

In some embodiments, the approximate computing engine 1306 uses a machine learning model 1308 (or simply a model 1308) to predict a control value corresponding to a point-in-time. Historical control values may be used to train the machine learning model 1308 as described herein for some embodiments; in contrast, other embodiments may not utilize historical control values. For each control value type, there is a method (e.g., a formula) for computing such control values; to illustrate by way of example, an exemplary NAV calculation method is described below with reference to a technique for computing an approximate NAV control value in real-time.

In general, the NAV calculation method processes as input variables $x_i$ at least i data items where each data item is a mathematical value (e.g., a price) and generates a Net Asset Value that includes, for the most part, an average value of the input data items. Such a Net Asset Value may be an average (e.g., a weighted average) of fund prices in a specific portfolio. There may be some intermediate steps in the above NAV calculation method. It is appreciated that those skilled in the art would be able to execute these intermediate steps. As an example, there may be a normalization step involving the above input data items to ensure proper execution of any mathematical operations on the mathematical values corresponding to such data items.

The machine learning model 1308 modifies the above-mentioned NAV calculation method in some manner, such as by applying a function (e.g., a polynomial function, a weight, and/or the like). The machine learning model 1308 may apply a weight to a specific input data item's value $x_i$ or a set of weights to a set of input data items. The machine learning model 1308 may apply a weight to another input value x, such as a partial prediction for a current Net Asset Value, a historical Net Asset Value, and/or the like. In other embodiments, the machine learning model 1308 may apply a polynomial function to the set of input data items or another value (e.g., a previous Net Asset Value, a partial Net Asset Value, and/or the like) and generate an output value y as an approximation or prediction of the current Net Asset Value. It is appreciated that the present disclosure envisions embodiments with any number of suitable mathematical functions for the machine learning model 1308.

The following description depicts an embodiment of the machine learning model 1308 that applies a function to the partial Net Asset Value in accordance with the request 1304. The partial Net Asset Value refers to a prediction of the current Net Asset Value using only a subset of the input data items. As described herein, the computing node 1302 may issue the request 1304 with an accuracy attribute (e.g., ninety percent (90) % threshold) or a timing attribute (e.g., two (2) milliseconds limit). The timing attribute refers to the subset of the input data items that can be captured within a time limit (e.g., the two (2) millisecond limit). The accuracy attribute refers to the subset of the input data items that matches a precision threshold. For instance, if a distribution of Net Asset Values is known (and uniform) and a size of the input data items is known, the ninety percent (90) % threshold translates into a computable statistic equal to a number less than the size of the input data items. Hence, that computable statistic establishes the size of the subset of the input data items. The approximate computing engine 1306 waits until the either the computable statistic or the time limit is reached with respect to the subset of the input data items before generating the partial Net Asset Value. Nonetheless, there is still a time limit (e.g., twenty (20) minutes) imposed on the accuracy attribute; however, if that time limit is exceeded, the approximate computing engine 1306 may issue an error and restart the NAV calculation. Similarly, the timing attribute has an implicit precision threshold that must be satisfied; otherwise, the approximate computing engine 1306 may issue an error and restart the NAV calculation.

Regarding the above-mentioned subset of the input data items, the machine learning model 1308 is configured to compute an approximation of the current Net Asset Value. As input, the machine learning model 1308 processes the partial Net Asset Value determined from the subset of the input data items. To illustrate by way of example, in some embodiments, the machine learning model 1308 processes, as input, a partial prediction of the current NAV using only a subset $x_j$ of fund prices and generates, as output, a weighted average of the subset $x_j$ as an approximation of the current Net Asset Value (i.e., the predicted Net Asset Value or NAV). Each weight used for the weighted average is determined, via training, of the machine learning model 1308. A fund's notoriety or reputation, one example feature, can translate into a weight for that fund in the approximation of the current Net Asset Value. It is appreciated that other features may be employed in addition or as alternative, or the weights may not refer to feature information at all. In other embodiments, the machine learning model 1308 processes, as input, a partial prediction of the current Net Asset Value using only a subset $x_j$ of fund prices and generates, as output, a value having a highest probability (e.g., likelihood) as an approximation of the current Net Asset Value. The machine learning model 1308 may produce a probability distribution of Net Asset Values given the partial Net Asset Value and select the Net Asset Value with the highest probability. It is appreciated that one or more additional features may be employed in computing the probability distribution of Net Asset Values given the partial Net Asset Value.

In one embodiment, the NAV calculation, initially, involves processing input data items that are prices of funds comprising a financial portfolio. These input data items correspond to input variables that are used in the NAV calculation. It is appreciated that there may be additional and/or different input variables used in the NAV calculation. Some input variables may be complete and well-defined; whereas, at least one input variable is not ready or incomplete in some manner and therefore, requires approximation. The machine learning model 1308, in general, provides a function and/or one or more weights to accomplish the approximation of the at least one input variable and ultimately, the real-time Net Asset Value.

In some embodiments, the approximate computing engine 1306 applies a weight to a corresponding data item of an input variable and produces a resulting value that is a prediction of an actual value for that corresponding data item. If, for example, a certain fund's price is partially known and incomplete, the weight adjusts that certain fund's partial price to approximate the actual price of that fund. If the certain fund's price is unknown, the weight adjusts that certain fund's previous price to approximate the actual price of that fund. In some embodiments, the approximate computing engine 1306 uses a partial Net Asset Value as an input variable to a polynomial function that modifies the partial Net Asset Value into an approximation of a current Net Asset Value in real-time. It is appreciated that the machine learning model 1308 may implement any number of techniques to accomplish the NAV approximation. It is further appreciated that the techniques are known to those skilled in the art and are applicable to other control values.

One exemplary embodiment of the approximate computing engine 1306 produces, for the computing node 1302, reports having various performance information including predicted Net Asset Values. The approximate computing engine 1306 may generate statistical information relating a range and a probability of where the NAV is most likely to fall in that range at that very moment. The range may be tailored to substantially match the computing demands of an organization behind the computing node 1302 and who made the request 1304.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device. For example, a logic flow may be implemented by a processor component executing instructions stored on an article of manufacture, such as a storage medium or a computer-program product. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 14:
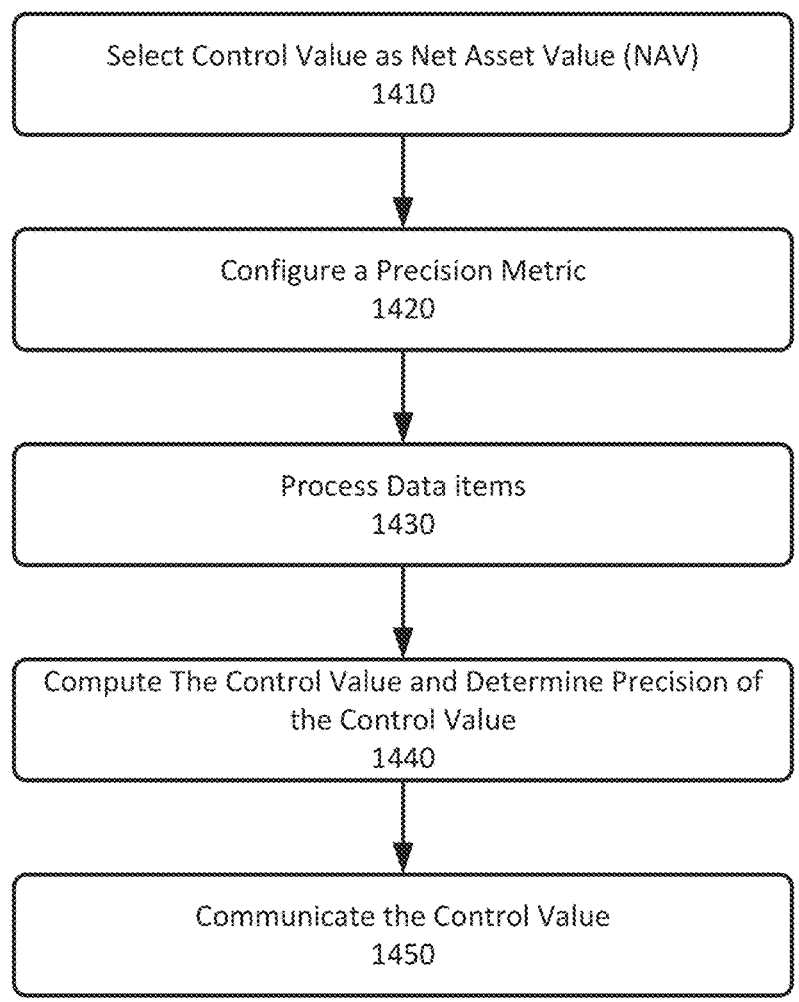
FIG. 14 illustrates a logic flow according to an embodiment.

FIG. 14 illustrates one embodiment of a logic flow 1400. The logic flow 1400 may be representative of some or all of the operations executed by one or more embodiments described herein. For instance, the logic flow 1400 may be representative of some or all of the operations executed by system 1300 or system 300, and the components and modules included therein.

At 1410, one or more control values may be selected via the system 1300 or the system 700. As described herein, one example control value may be a Net Asset Value (NAV). At 1420, one or more precision metrics are configured for determining an accuracy of the selected control value. The one or more precision metrics refer to a timing attribute, an accuracy attribute, or both a timing attribute and an accuracy attribute, as described herein. At 1430, data items are processed. In one embodiment, the data items are prices of funds that comprise a subset (e.g., a sample) of a financial portfolio and correspond to variables that compute the selected control value. The number or size of the data items is determined by either the accuracy attribute or the timing attribute. The system 1300 may use stock prices as at least some of the data items used in computing the selected control value. In one embodiment, the size of the data items is set as a number of stock prices that are captured within a time limit established by the timing attribute. In one embodiment, the size of the data items is set as a number of stock prices to satisfy a statistical error established by the accuracy attribute.

At 1440, the selected control value is computed, and a precision of the selected control value is determined. As described herein, the precision metric may determine a likelihood of the selected control value being within a configurable range of values. Thus, the precision of the selected control value refers to the likelihood of the selected control value being within a configurable range of values. At 1450, the selected control value is communicated, for example, to a computing device operated by the financial portfolio's manager. This communication may trigger an automatic response by the computing device operated by the financial portfolio's manager, such as one with respect to a business decision. It is appreciated that any number of business decisions are envisioned by the present disclosure, including those business decisions that are part of some autonomous computing system. For instance, the automatic response may be to buy additional holdings or sell excess holdings.

Figure 15:
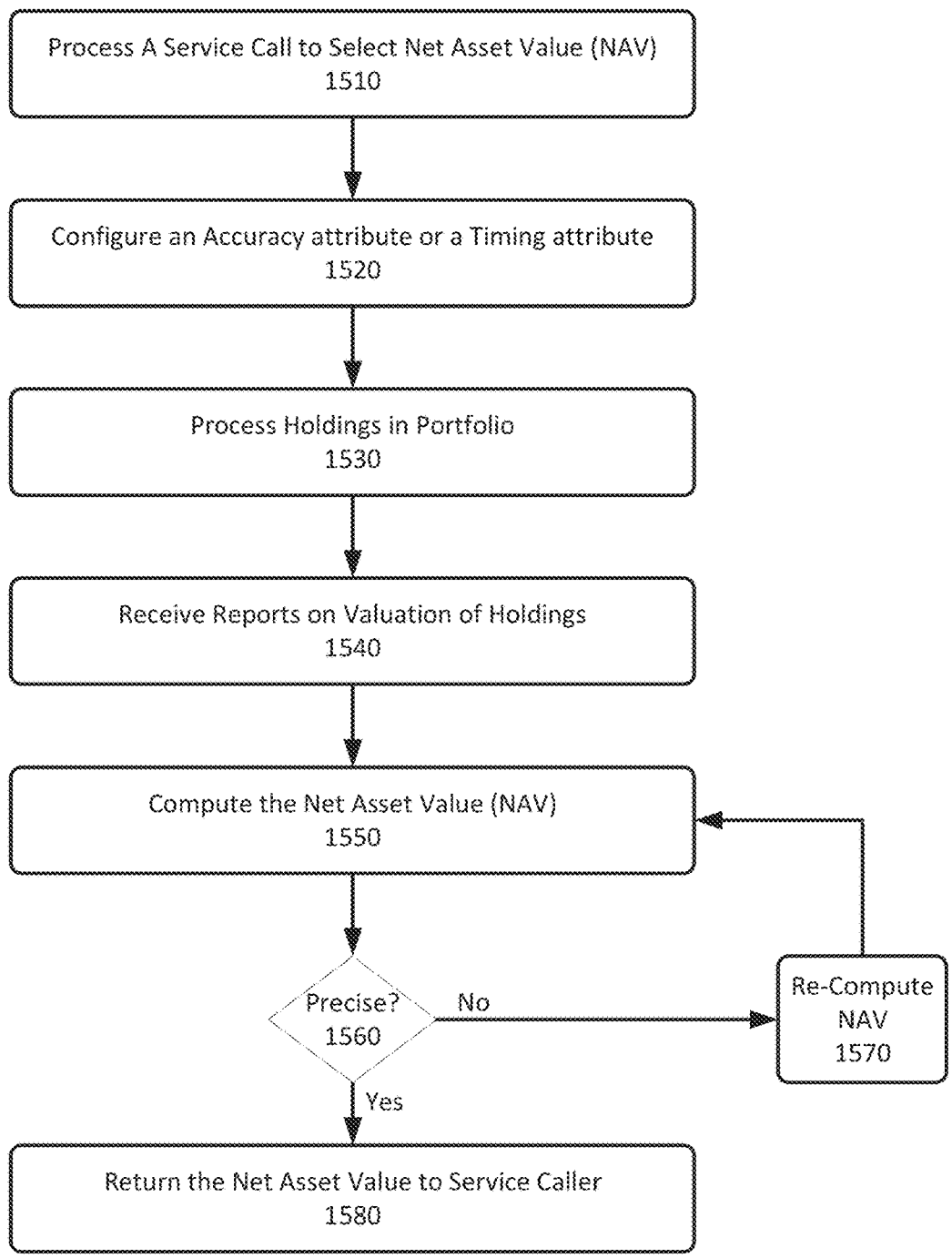
FIG. 15 illustrates another logic flow according to an embodiment.

FIG. 15 illustrates one embodiment of a logic flow 1500. The logic flow 1500 may be representative of some or all of the operations executed by one or more embodiments described herein. For instance, the logic flow 1500 may be representative of some or all of the operations executed by system 1300 or system 500, and the components and modules included therein.

At 1510, a service call is processed to select a Net Asset Value (NAV). The computing node 1302 of the system 1300 is a Service Caller and invoked the service call. At 1520, an accuracy attribute or a timing attribute is configured. Both the accuracy attribute and the time attribute refer to a precision metric of the Net Asset Value (NAV). As described herein, the accuracy attribute or the timing attribute refers to an acceptable statistical error for the Net Asset Value (NAV) computation and/or a time period to wait before computing the Net Asset Value (NAV). Both the accuracy attribute and the time attribute translate into a size of a subset (i.e., sample) of holdings (e.g., funds) for computing the Net Asset Value (NAV). For instance, the accuracy attribute may be set to a 15% statistical error such that a predicted Net Asset Value (NAV), in order to be deemed precise, must be estimated to be at least 85% of an actual Net Asset Value (NAV). To be clear, the predicted Net Asset Value (NAV) may exceed or fall short of the actual Net Asset Value (NAV) by at most 15%. Therefore, the size of the subset of holdings may be a computable statistic based upon a distribution of actual Net Asset Values. The timing attribute, in another example, may be set to five (5) minutes and the size of the subset of holdings may be a number of holding prices acquired within the 5 minutes. With respect to the timing attribute, the number of holdings within the 5 minutes translates into a certain statistical error (e.g., 15%) given a distribution of actual Net Asset Values.

At 1530, holdings in a financial portfolio are processed. In one embodiment, the system 1300 configured the approximate computing engine 1306 with device(s) to receive data items over a network of which some data items include fund prices and/or other information pertaining to the holdings in the financial portfolio. In some embodiments, the approximate computing engine 1306 receives at least some of a plurality of information items over the network and utilizes an immutable log to record the plurality of information items of which each information item represents a data item, a cancelation of a previous data item, or a correction of a previous data item. The immutable log is configured as a relational database and the approximate computing engine 1306 includes logic configured to refrain from changing or deleting any of the information items in the immutable log.

At 1540, reports on valuation of holdings are received. The holdings, as described herein, may refer to funds (e.g., stocks) in the financial portfolio. The valuation of these holdings depends (at least in part) upon market prices for the holdings. At 1550, the Net Asset Value (NAV) is computed. At 1560, a determination is made as to whether the Net Asset Value (NAV) is precise when compared to the accuracy attribute or the time attribute. The Net Asset Value (NAV) may be precise if above a certain likelihood of being within a configurable range of values. At 1570, the Net Asset Value (NAV) is determined to be imprecise and is promptly re-computed. At 1580, the Net Asset Value (NAV) is returned to the Service Caller.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. An apparatus comprising:
   memory; and
   a processing circuit coupled with the memory and at least one hardware circuit operative to:
      train a machine learning model on historical data to approximate a Net Asset Value for a financial portfolio, where the Net Asset Value is a weighted average of prices of funds in the financial portfolio, with historical data items corresponding to prices of a subset of less than all of the funds in the financial portfolio and corresponding historical Net Asset Values, the training comprising:
         determining the weights to be assigned to the data items for approximating the Net Asset Value;
      receive a request from a requestor for a Net Asset Value of a selected financial portfolio with a timing attribute, the timing attribute to establish a time limit for capturing current data items responsive to the request;
      input to the machine learning model the data items corresponding to prices for a subset of less than all funds in the selected financial portfolio, wherein the subset includes ones of the funds in the selected portfolio for which current data items may be obtained within a time limit;
      determine, via the machine learning model, an approximation of the Net Asset Value for the selected financial portfolio in real time or near real time before an end of trading of funds in the selected financial portfolio based upon the current data items for the subset of funds of the selected financial portfolio at a particular point in time to approximate the Net Asset Value for the selected financial portfolio at the particular point in time based on the subset of the funds and the weights determined for the data items by the machine learning model;
      determine a precision of the approximation of the Net Asset Value for the selected financial portfolio, the precision based on the size of the subset of funds for which data items are captured within the time limit, wherein the size of the subset of funds is based on the time limit; and
      output the approximation of the Net Asset Value for the selected financial portfolio to the requestor in response to the request to automatically trigger a buy or sell transaction.

2. The apparatus of claim 1, the processing circuit to operate a private cloud service for a computing node, process the request for the Net Asset Value for the selected financial portfolio from the computing node, and communicate the approximation of the Net Asset Value for the selected financial portfolio to the computing node.

3. The apparatus of claim 2, wherein a subsequent request comprises a timing attribute or an accuracy attribute.

4. The apparatus of claim 1 further comprising
   an interface configured to receive a plurality of information items, each of the information items representing a one of the data items, a cancelation of a previous one of the data items, or a correction of a previous one of the data items; and
   a data storage configured to store the plurality of information items in an immutable log, wherein the data storage is configured to refrain from changing or deleting any of the information items in the immutable log and the immutable log is configured as a relational database.

5. The apparatus of claim 4 further comprising code configured to implement a service to calculate a derived value from the information items and to store the derived value in a derived log distinct from the immutable log.

6. The apparatus of claim 5, wherein the apparatus is further configured to store information describing the code in a derived log distinct from the immutable log.

7. A computer-implemented method in a computer-networked environment, the method comprising:
   training a machine learning model on historical data to approximate Net Asset Value for a financial portfolio, where the Net Asset Value is a weighted average of prices of funds in the financial portfolio, with historical data items corresponding to prices of a subset of less than all of the funds in the financial portfolio and corresponding historical Net Asset Values, the training comprising:
      determining the weights to be assigned to the data items for approximating the Net Asset Value;
   receiving a request from a requestor for a Net Asset Value for a selected financial portfolio with a timing attribute, the timing attribute to establish a time limit for capturing data items responsive to the request;
   processing the data items corresponding to prices for a subset of less than all funds in the selected financial portfolio, wherein the subset includes ones of the funds in the selected portfolio for which current data items may be obtained within a time limit;
   determining, by the machine learning model, an approximation of the Net Asset Value for the selected financial portfolio in real time or near real time before an end of trading of funds in the selected financial portfolio based upon the data items for the subset of funds of the selected financial portfolio at a particular point in time to approximate the Net Asset Value for the selected financial portfolio at the particular point in time based on the subset of the funds and weights determined for the data items by the machine learning model;

determining a precision of the approximation of the Net Asset Value for the selected financial portfolio, the precision based on the size of the subset of funds for which data items are captured within the time limit, wherein the size of the subset of funds is based on the time limit; and outputting the approximation of the Net Asset Value for the selected financial portfolio to the requestor in response to the request to automatically trigger a buy or sell transaction.

8. The computer-implemented method of claim 7, further comprising storing in an immutable log a plurality of informational items of which each of the information items representing one of the data items, a cancelation of a previous one of the data items, or a correction of a previous one of the data items, wherein the immutable log is configured as a relational database and cannot be changed.

9. A system comprising:

an interface configured to receive a plurality of information items, each of the information items representing a data point, a cancelation of a previous data point, or a correction of a previous data point;

a processing circuit to train a machine learning model on historical data to approximate Net Asset Value for a financial portfolio, where the Net Asset Value is a weighted average of prices of funds in the financial portfolio, with historical data items corresponding to prices of a subset of less than all of the funds in the financial portfolio and corresponding historical Net Asset Values, the training comprising:

determining to determine the weights to be assigned to the data items for approximating the Net Asset Value;

receive a request from a requestor for a Net Asset Value of a selected financial portfolio with a timing attribute, the timing attribute to establish a time limit for capturing data items responsive to the request;

input into the machine learning model the data items corresponding to prices for a subset of less than all funds in the selected financial portfolio, wherein the subset includes ones of the funds in the selected portfolio for which current data items may be obtained within a time limit, and determine a precision of the approximation of the Net Asset Value for the selected financial portfolio, the precision based on the size of the subset of funds for which data items are captured within the time limit, wherein the size of the subset of funds is based on the time limit, and output an approximation of the Net Asset Value of the selected financial portfolio to the requestor in response to the request to automatically trigger a buy or sell transaction;

the machine learning model to determine the approximation of the Net Asset Value for the selected financial portfolio in real time or near real time before an end of trading of funds in the selected financial portfolio based upon the data items for a subset of funds of the selected financial portfolio and the information items at a particular point in time to approximate the Net Asset Value for the selected financial portfolio at the particular point in time based on the subset of the funds, weights determined for the data items by the machine learning model and the information items; and data storage configured to store the plurality of information items in an immutable log, wherein the data storage is configured to refrain from changing or deleting any of the information items in the immutable log and the immutable log is configured as a relational database.

10. The system of claim 9, wherein the interface is configured to receive financial transaction data.

11. The system of claim 9, the processing circuit to implement a service to calculate a derived value from the information items.

12. The system of claim 11, wherein the service is configured to store the derived value in a derived log distinct from the immutable log, wherein the service comprises code.

13. The system of claim 11, wherein the system is further configured to store information describing the code in a derived log distinct from the immutable log.

* * * * *

UNITED STATES PATENT AND TRADEMARK OFFICE
CERTIFICATE OF CORRECTION

| | |
|---|---|
| PATENT NO. | : 11,875,408 B2 |
| APPLICATION NO. | : 16/390406 |
| DATED | : January 16, 2024 |
| INVENTOR(S) | : Fadi Gebara et al. |

It is certified that error appears in the above-identified patent and that said Letters Patent is hereby corrected as shown below:

In the Claims

Column 37, Claim 9, Line 34, replace "determining to determine the weights to be assigned" with --determining the weights to be assigned--

Column 38, Claim 9, Line 2, replace "obtained within a time limit, and" with --obtained within a time limit;--

Signed and Sealed this
Twenty-third Day of April, 2024

Katherine Kelly Vidal
*Director of the United States Patent and Trademark Office*